(12) United States Patent
Nakata

(10) Patent No.: US 11,023,546 B2
(45) Date of Patent: Jun. 1, 2021

(54) DATA DELIVERY SYSTEM AND SERVER

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 417 days.

(21) Appl. No.: 15/914,371

(22) Filed: Mar. 7, 2018

(65) Prior Publication Data

US 2018/0260485 A1 Sep. 13, 2018

(30) Foreign Application Priority Data

Mar. 9, 2017 (JP) .............................. JP2017-045162
Jan. 30, 2018 (JP) .............................. JP2018-013910

(51) Int. Cl.
*G06F 16/00* (2019.01)
*G06F 16/9535* (2019.01)
*G06F 16/27* (2019.01)
*H04L 29/08* (2006.01)
*G06F 16/33* (2019.01)

(52) U.S. Cl.
CPC .......... *G06F 16/9535* (2019.01); *G06F 16/27* (2019.01); *G06F 16/3331* (2019.01); *H04L 67/025* (2013.01); *H04L 67/104* (2013.01); *H04L 67/12* (2013.01)

(58) Field of Classification Search
CPC .................................................. G06F 16/3331
See application file for complete search history.

(56) References Cited

U.S. PATENT DOCUMENTS

| 6,226,589 | B1 | 5/2001 | Maeda et al. | |
| 2003/0217097 | A1* | 11/2003 | Eitel | H04L 67/02 709/202 |
| 2013/0267200 | A1* | 10/2013 | Weiner | G06Q 20/3223 455/411 |

FOREIGN PATENT DOCUMENTS

JP 3721001 B2 11/2005

* cited by examiner

*Primary Examiner* — Ajith Jacob
(74) *Attorney, Agent, or Firm* — Maschoff Brennan

(57) ABSTRACT

A data delivery system includes: a server for obtaining a first query requesting data from a user device. The first query includes data requirements for data requested by the user device. The data delivery system also includes a data providing terminal for providing terminal data to the server, as either the user-requested data or as data from which the user-requested data is derivable. The data delivery system enables the user device to obtain the user-requested data. The server includes: a first query obtainer for obtaining the first query from the user device; a second query determiner for determining a second query by using attributes that enable the data providing terminal to identify the terminal provided data; and a server transmitter for transmitting the second query to the data providing terminal.

28 Claims, 12 Drawing Sheets

TERMINAL REQUIREMENTS CORRESPONDENCE TABLE

| No. | OBJ. PROCESS | OBJECT DATA REQUIREMENTS | | | | | | RECEIVER TERMINAL REQUIREMENTS | | | | | |
|---|---|---|---|---|---|---|---|---|---|---|---|---|---|
| | | | | | | | | TERM. TYPE C | ATTR 1 | REQ 1 | ATTR 2 | REQ 2 | FILL RATE SCORE |
| | | ATTR 1 | REQ 1 | ATTR 2 | REQ 2 | ATTR 3 | REQ 3 | | | | | | |
| 1 | TRANSFER QRY TO REQUESTER | DATA TYPE | IMAGE | TARGET POS. | INTXN X | – | – | TYPE C1 F CAM | LATEST CAR POS. | WITHIN 100 m RADIUS ON X | 1 SEC- BEFORE CAR POS. | FARTHER THAN LATEST CAR POS. FROM X | 1/{max (10m, \|y-x\|)} |
| 2 | ↑ | ↑ | ↑ | ↑ | ↑ | ↑ | ↑ | TYPE C2 F+R CAM | LATEST CAR POS. | WITHIN 100 m RADIUS ON X | – | – | 2/{max (10m, \|y-x\|)} |
| 3 | ↑ | DATA TYPE | AVG TRV SPD | POS. AREA | 100 m RADIUS CIRCLE ON X | TIME | t | – | POS. | 100- m RADIUS CIRCLE ON X | TIME | t | |

FIG. 4

TERMINAL REQUIREMENTS CORRESPONDENCE TABLE

| No. | OBJ. PROCESS | 1ST QUERY — OBJECT DATA REQUIREMENTS | | | | | | RECEIVER TERMINAL REQUIREMENTS | | | | |
|---|---|---|---|---|---|---|---|---|---|---|---|---|
| | | ATTR 1 | REQ 1 | ATTR 2 | REQ 2 | ATTR 3 | REQ 3 | TERM. TYPE C | ATTR 1 | REQ 1 | ATTR 2 | REQ 2 | FILL RATE SCORE |
| 1 | TRANSFER QRY TO REQUESTER | DATA TYPE | IMAGE | TARGET POS. | INTXN X | — | — | TYPE C1 F CAM | LATEST CAR POS. | WITHIN 100 m RADIUS ON X | 1 SEC-BEFORE CAR POS. | FARTHER THAN LATEST CAR POS. FROM X | 1/{max(10m, \|y−x\|)} |
| 2 | ↑ | ↑ | ↑ | ↑ | ↑ | ↑ | ↑ | TYPE C2 F+R CAM | LATEST CAR POS. | WITHIN 100 m RADIUS ON X | — | — | 2/{max(10m, \|y−x\|)} |
| 3 | ↑ | DATA TYPE | AVG TRV SPD | POS. AREA | 100 m RADIUS CIRCLE ON X | TIME | t | — | POS. | 100−m RADIUS CIRCLE ON X | TIME | t | |

FIG. 5

QUERY CORRESPONDENCE TABLE

| No. | 1ST QUERY | | | | | | 2ND QUERY | | | | |
|---|---|---|---|---|---|---|---|---|---|---|---|
| | OBJ. PROCESS | OBJECT DATA REQUIREMENTS | | | | | OBJ. PROCESS | OBJECT DATA REQUIREMENTS | | | |
| | | ATTR 1 | REQ 1 | ATTR 2 | REQ 2 | ATTR 3 | REQ 3 | | ATTR 1 | REQ 1 | ATTR 2 | REQ 2 |
| 1 | TRANSFER QRY TO REQUESTER | DATA TYPE | IMAGE | TARGET POS. | X | – | – | SEND TO SERVER | SENSOR TYPE | F CAM | CAR POS. | WITHIN IN-VIEW RANGE BEFORE X |
| 2 | ← | ← | ← | ← | ← | ← | ← | SEND TO SERVER | SENSOR TYPE | F+R CAM (ON X SIDE) | CAR POS. | CAR POS. IS WITHIN IN-VIEW RANGE FROM X |
| 3 | ← | DATA TYPE | AVG TRV SPD | POS. AREA | 100 m RADIUS CIRCLE ON X | TIME | t | SEND TO SERVER | SEND OBJ. DATA TYPE | TRV SPD | TIME | t |

FIG. 8

QUERY CORRESPONDENCE TABLE

| No. | 1ST QUERY | | | | | | | | | PROCESS REQUIREMENTS OF 2ND QUERY | | | | | | |
|---|---|---|---|---|---|---|---|---|---|---|---|---|---|---|---|---|
| | OBJ. PROCESS | OBJ. DATA REQ. | | | | EXEC. REQ. | | | | ATTR 1 | REQ 1 | ATTR 2 | REQ 2 | ATTR 3 | REQ 3 | FILL COST |
| | | ATTR 1 | REQ 1 | ATTR 2 | REQ 2 | ATTR 1 | REQ 1 | ATTR 2 | REQ 2 | | | | | | | |
| 4 | TRANSFER QRY TO REQUEST-ER | DATA TYPE | IMAGE | TARGET POS. | X | USE | REAL-TIME MON. | — | — | WIRELESS CH. SPD | >5Mbps | FRAME RATE | >10fps | TRANSFER DELAY | <1s | CH USE TIME × BIT PRICE /s |
| 5 | SAVE | DATA TYPE | MP3 SOUND | TARGET POS | X | SAVE TIME | T | DATA RATE | >w kbps | STORAGE CPTY | >wT | — | — | — | — | — |

FIG. 9

| 1ST QUERY | | | | | | | | | | | | | | |
|---|---|---|---|---|---|---|---|---|---|---|---|---|---|---|
| OBJ. PROCESS | OBJ. DATA REQ. | | | | | | EXEC. REQ. | | RECEIVER TERMINAL REQUIREMENTS | | | | | |
| | ATTR 1 | REQ 1 | ATTR 2 | REQ 2 | ATTR 3 | REQ 3 | ATTR 1 | REQ 1 | TERM. TYPE | ATTR 1 | REQ 1 | ATTR 2 | REQ 2 | ATTR 3 | REQ 3 |
| TRANSFER QRY TO REQUESTER | DATA TYPE | IMAGE | TARGET POS. | X | TIME | FOR 10 SEC. FROM 9:00 | USE | ROAD COND. CONF. | TERM. TYPE C1 | CAR POS. | WITHIN 100 m FROM (a, b) AT 9:00 | TRV DIR. | COME CLOSE TO (a, b) AT 9:00 | COMM. SPD | >5 Mbps OR WITHIN 1 km FROM WIRELESS LAN AREA |
| | | | | | | | | | TERM. TYPE C2 | CAR POS. | WITHIN 100 m FROM (a, b) AT 9:00 | — | — | COMM. SPD | >5 Mbps OR WITHIN 1 km FROM WIRELESS LAN AREA |

FIG. 10

| 1ST QUERY | | | | | | | | | 2ND QUERY | | | | | | | | | |
|---|---|---|---|---|---|---|---|---|---|---|---|---|---|---|---|---|---|---|
| OBJ. PROCESS | OBJ. DATA REQ. | | | | | | EXEC. REQ. | | OBJ. PROCESS | OBJ. DATA REQ. | | | | | | | PROCESS REQ. | |
| | ATTR 1 | REQ 1 | ATTR 2 | REQ 2 | ATTR 3 | REQ 3 | ATTR 1 | REQ 1 | | ATTR 1 | REQ 1 | ATTR 2 | REQ 2 | ATTR 3 | REQ 3 | | ATTR 1 | REQ 1 |
| TRANSFER QRY TO REQUESTER | DATA TYPE | IMAGE | TARGET POS. | X | TIME | FOR 10 SEC. FROM 9:00 | USE | ROAD COND. CONF. | SEND TO SERVER | SENSOR TYPE | F CAM | CAR POS. | IN-VIEW RANGE BEFORE (a, b) AT 9:00 | TIME | FOR 10 SEC. FROM 9:00 | | TRANS-FER DELAY | WITHIN 5 MIN |
| | | | | | | | | | SEND TO SERVER | SENSOR TYPE | F+R CAM (ON X SIDE) | CAR POS. | IN-VIEW RANGE FROM (a, b) AT 9:00 | TIME | FOR 10 SEC. FROM 9:00 | | TRANS-FER DELAY | WITHIN 5 MIN |

DATA DELIVERY SYSTEM AND SERVER

CROSS REFERENCE TO RELATED APPLICATION

The present application is based on and claims the benefit of priority of Japanese Patent Applications No. 2017-045162, filed on Mar. 9, 2017, and No. 2018-013910, filed on Jan. 30, 2018, the disclosure of which are incorporated herein by reference.

TECHNICAL FIELD

The present disclosure generally relates to a system for obtaining and delivering data and a server used therein.

BACKGROUND INFORMATION

Patent document 1, i.e., Japanese Patent No. 3721001 discloses a system including a terminal device, such as a personal digital assistant (PDA), for a registered mobile object (i.e., a person, animal, object, thing) and a management center. The management center in the system of patent document 1 is equipped with a memory section that manages a position and an attribute of the registered mobile object. When a terminal device for a subject mobile object tries to find another mobile object, the terminal device transmits a "find condition" to the management center that includes a position of another mobile object. The management center, upon receiving the find condition, searches the memory section for another mobile object that satisfies the find condition. Then, after searching, the management center transmits a position of another mobile object found during the search back to the terminal device of the subject mobile object.

Patent document 1 further discloses that the management center is setup in advance to register and store attributes of each of the mobile objects and the terminal device for the mobile object uploads updated position data to the management center whenever position data for the mobile object is updated.

Each of the items in the find condition that is transmitted from the terminal device to the management center corresponds to an item of mobile object data stored in the memory section of the management center. The system described in patent document 1 allows a requesting terminal device to find a mobile object having a certain attribute. For achieving such purpose, each of the terminal devices periodically uploads the current position of the terminal device to the management center In patent document 1, the data update performed by the terminal device is only for the position data. However, the terminal device may be used to obtain data other than position data. That is, image data and/or sound data may be captured and uploaded to the management center or to a station, for example. Further, the data provided by the terminal device may not only be used for finding the mobile object, but may be used for various other purposes as well.

When the data is usable for various purposes, the data may be sorted, filtered, identified, or selected by various attributes. In some cases, the data-identifying attributes used by the terminal providing the data do not match the data-identifying attributes of the terminal device requesting the data.

For example, a terminal device (i.e., user device) requesting an image of an intersection "X," may specify that the data be an image, or may make a request by an image type. The user device may also request an image of intersection X based on location, for example, based on the GPS coordinates of intersection X. However, a terminal device with image data of intersection X may identify the image data based on the location of the terminal capturing the image of intersection X, rather than the actual, geographical location of intersection X. That is, the captured image of intersection X may be tagged with position Y (i.e., the position of the terminal device capturing the image of intersection X) as the data-identifying attribute.

Data requested by the user device (i.e., user-request data) may not always be raw data provided by the terminal device that captures and/or generates the data. That is, in other words, the user-request data may sometimes need to be processed and derived (i.e., sorted, filtered, selected, etc.) from among all the data provided by one or more terminal devices.

The data requested by the user device could be delivered directly to the user device, if a user or the user device could identify and/or specify the data-identify attributes tagged to the data by the data providing terminal device and by sending a data request that specifies the exact data-identifying attributes. However, it may be difficult for the user of the user device to identify and/or specify a specific or exact data-identifying attribute used by the data providing terminal device.

SUMMARY

It is an object of the present disclosure to provide a data delivery system and a server of such system that may assist a user device in obtaining user-requested data and delivering the user-requested data to a user device.

In an aspect of the present disclosure, a data delivery system may include a server configured to obtain a first query from a user device and a data providing terminal configured to provide terminal data to the server. The terminal data may be either user-requested data or data from which the user-requested data may be derived. The server may include a first query obtainer configured to obtain the first query from the user device. The first query may be a data request from the user device that may specify the requirements of the user-requested data. The server may also include a second query determiner configured to determine a second query that may be a data request including one or more data attributes. The second query may enable the data providing terminal to identify the terminal data based on the first query obtained by the first query obtainer. The second query may include the one or more data attributes for identifying the user-requested data that may satisfy the requirements of the first query. The server may further include a server transmitter configured to transmit the second query to the data providing terminal. The data providing terminal may include a terminal receiver configured to receive the second query transmitted from the server, a data obtainer configured to obtain the terminal data by executing the second query from the terminal receiver, and a terminal transmitter configured to transmit the terminal data obtained by the data obtainer to a device, i.e. a user device, identified by the second query.

In another aspect, a server that obtains a first query from a user device, where the first query defines requirements for user-requested data requested by the user device, may include: a first query obtainer configured to obtain the first query from the user device; a second query determiner configured to determine a second query that includes a terminal data identifying attribute, the terminal data identifying attribute configured to enable the data providing terminal to identify terminal data that is either the user-requested data or data from which the user-requested data is derivable based on the first query; and a server transmitter configured to transmit the second query to the data providing terminal.

According to the present disclosure, when the user device transmits the first query to the server, the server may determine the second query based on the first query. The second query is a data request for obtaining terminal data that may be either the user-requested data itself, as requested by the first query, or data from which the user-requested data may be derived, by using the data-identifying attribute used by the data providing terminal. By transmitting the second query to the user device, the user device may obtain the user-requested data without having to specifically identify the data by using the data-identifying attribute used by the data providing terminal. That is, when the data providing terminal receives the second query from the server, the data providing terminal may be configured to identify, and to provide the terminal data that should be sent back to the user device.

BRIEF DESCRIPTION OF THE DRAWINGS

Objects, features, and advantages of the present disclosure will become more apparent from the following detailed description made with reference to the accompanying drawings, in which:

FIG. 4 illustrates a correspondence table for terminal requirements;

FIG. 5 illustrates a query correspondence table;

FIG. 8 illustrates a query correspondence table;

FIG. 9 illustrates receiver terminal requirements;

FIG. 10 illustrates a second query;

DETAILED DESCRIPTION

In the embodiments described herein, the same numerals may be used to identify the same components used in different embodiments for sake of brevity in the description. For the sake of brevity, the embodiments described herein may only partially describe a configuration if the configuration has been fully described by another embodiment. The combination of two or more embodiments may be explicitly described, but such combinations are not limited to only those explicitly described. That is, two or more embodiments may be combined so long as they are not hindered by other factors.

<First Embodiment>

Figure 1:
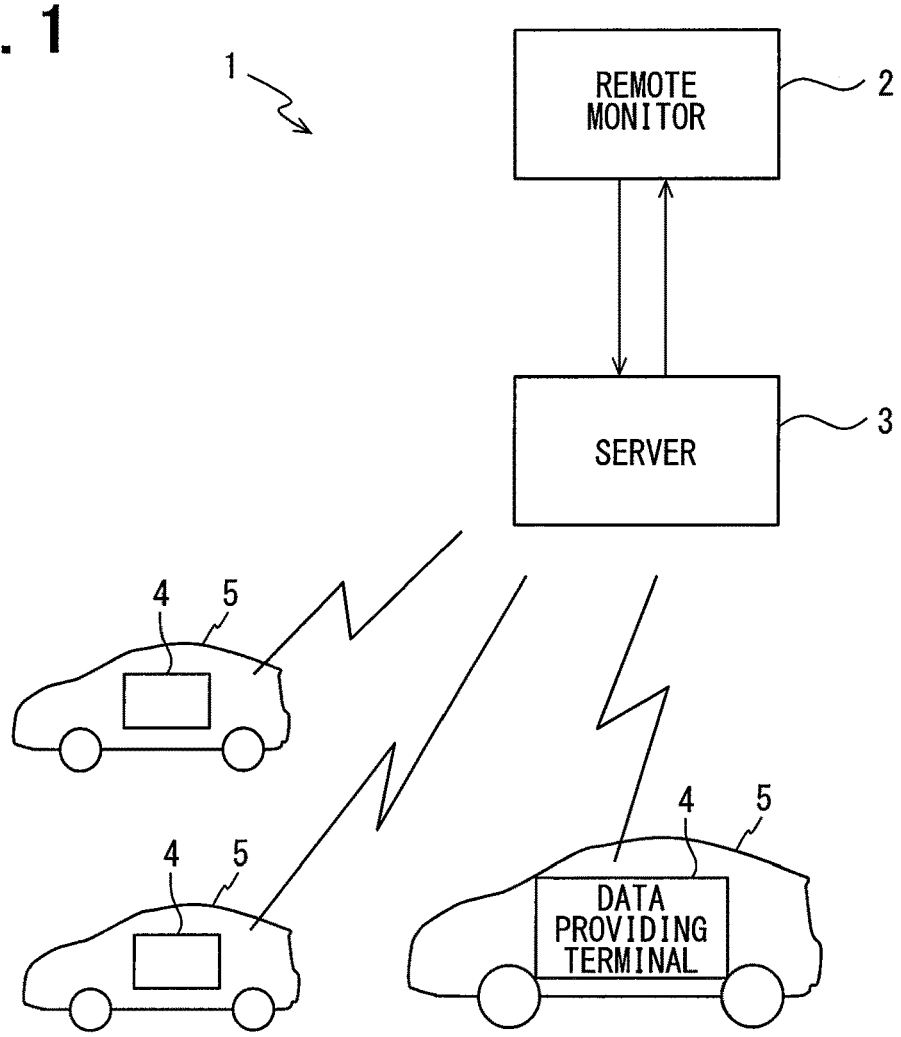
FIG. 1 illustrates a block diagram of a configuration of a data delivery system.

A data delivery system 1 used in the first embodiment is provided with a remote monitor 2, a server 3, and a data providing terminal 4, as shown in FIG. 1. The outline of the data delivery system 1 is described with reference to FIG. 1.

The remote monitor 2 corresponds to a user device operated by a user who may use the remote monitor 2 to request user-requested data. The user-requested data may be data that is requested by a user device. The remote monitor 2 may obtain image data and use the image data to view and/or monitor either a real-time image or captured image of a remote location, object, and the like. The remote monitor 2 transmits a first query to the server 3. The first query is a request from the remote monitor 2 (i.e., a query requester) to the server 3 for transmission of image data to the query requester. The data identified and specified by the first query may be referred to as the user-requested data. The query requester is a device that transmits the first query. That is, the first query originates from the remote monitor 2 and is transmitted to the server 3.

The server 3 obtains a first query and determines a second query from the first query. The second query is then transmitted to the data providing terminal 4. The second query is a request for obtaining the image data and a request to transmit the obtained image data to the server 3.

The data providing terminal 4 may be disposed within a vehicle 5. The vehicle 5 may be a vehicle having four wheels, a truck having more than four wheels, or a motor cycle or like vehicle having only two wheels.

The data providing terminal 4 executes the second query upon receiving the second query. The second query may be a request for obtaining image data and a request to transmit the obtained image data to the server 3. Therefore, when executing the second query, the data providing terminal 4 obtains the image data and transmits the image data to the server 3. The data provided by the data providing terminal 4 by the second query is terminal-provided data, or "terminal data," for short.

The server 3 transmits the image data to the remote monitor 2 so that the remote monitor 2 can obtain the image data.

[Configuration of the Remote Monitor]

Figure 2:
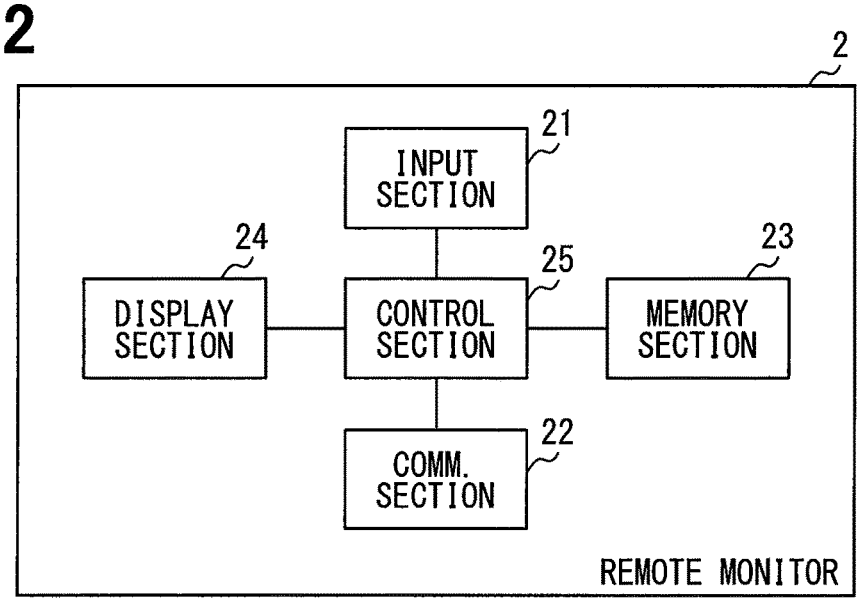
FIG. 2 illustrates a block diagram of a configuration of a remote monitor shown in FIG. 1.

As shown in FIG. 2, the remote monitor 2 may be provided with an input section 21, a communication section 22, a memory section 23, a display section 24, and a control section 25. The input section 21 is a section operated by the user to input a first query. The input section 21 may be, for example, a keyboard. The communication section 22 transmits and receives data to and from the server 3. Wireless communications or wired communications may be performed by the communication section 22. The memory section 23 accumulates the image data transmitted from the server 3. The display section 24 displays an image based on the image data transmitted from the server 3.

The control section 25 may control the communication section 22, the memory section 23, and the display section 24. The control section 25 transmits the first query to the server 3 from the communication section 22, when the first query is input by the input section 21. When the image data requested by the first query is transmitted from the server 3, the control section 25 stores the image data to the memory section 23 and displays the image associated with the image data in the display section 24.

[Configuration of the Server]

Figure 3:
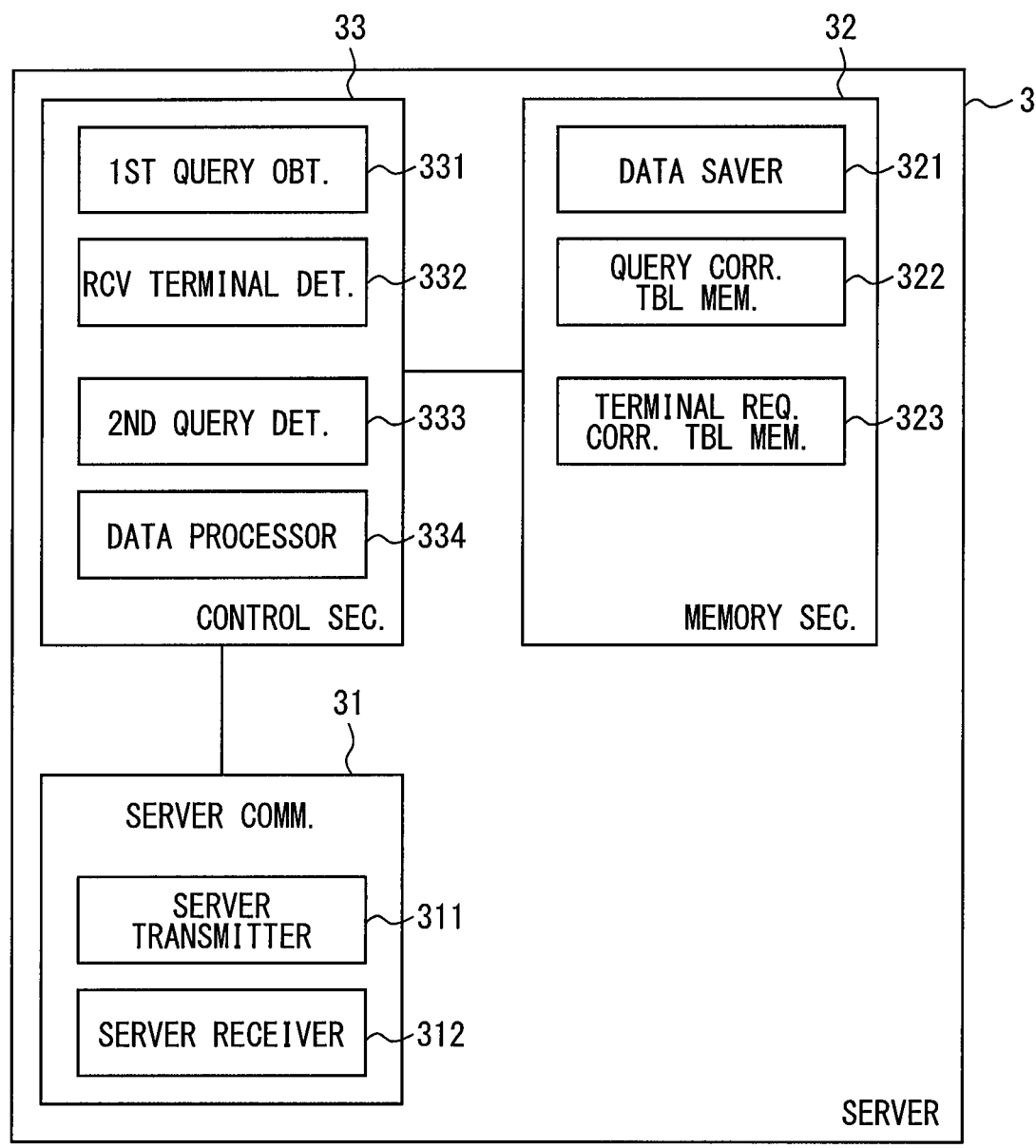
FIG. 3 illustrates a block diagram of a configuration of a server shown in FIG. 1.

With reference to FIG. 3, the server 3 may be provided with a server communicator 31, a memory section 32, and a control section 33. The server communicator 31 includes a server transmitter 311 and a server receiver 312. The server transmitter 311 transmits data to the data providing terminal 4 and to the remote monitor 2. The data transmitted to the data providing terminal 4 may be the second query, and the data transmitted to the remote monitor 2 is the data requested by the first query.

The server transmitter 311 may transmit data to the data providing terminal 4 and to the remote monitor 2 by using two different transmission technologies (i.e., wired or wireless) or may transmit the data by using the same transmission technology, i.e., one technology. Since the data providing terminal 4 is disposed within a mobile vehicle 5, the transmission of data to the data providing terminal 4 is wireless. Wireless transmission means that a transmission path from a base station, i.e. transmitting/receiving device, to the data providing terminal 4 is wireless, but the communication between the base station and the server 3 may be either wired or wireless.

The server receiver 312 receives data from the data providing terminal 4 and from the remote monitor 2. The data received from the data providing terminal 4 is the data requested by the second query and the data received from the remote monitor 2 is the first query.

The server receiver 312 may receive data from the data providing terminal 4 and the remote monitor 2 by using two different transmission technologies (i.e., wired and wireless), or may receive data from the data providing terminal 4 and the remote monitor 2 by using only one transmission technology. However, the reception of the data from the data providing terminal 4 is wireless. Wireless reception means that a reception path from a base station to the data providing terminal 4 is wireless.

The memory section 32 is provided with a non-transitive, substantive storage memory, such as flash memory or a like memory, to which data may be written. The memory section 32 may serve as a data saver 321, a query correspondence table memory 322, and a terminal requirements correspondence table memory 323.

Figure 6:
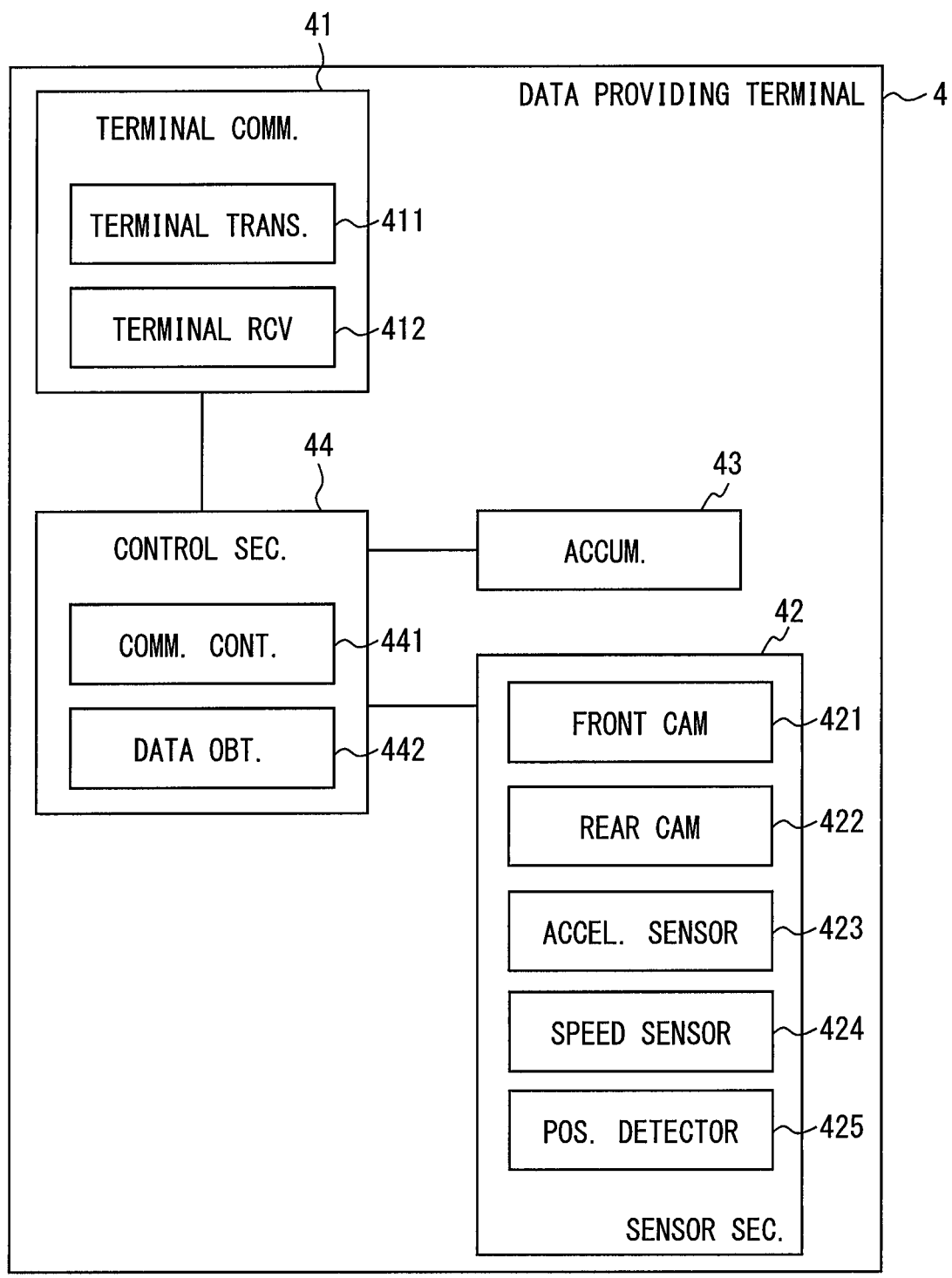
FIG. 6 illustrates a block diagram of a configuration of a data providing terminal shown in FIG. 1.

The data saver 321 saves and stores the data transmitted from the data providing terminal 4 and received by the server receiver 312. Data stored by the data saver 321 may include a terminal ID of the data providing terminal 4, information on a second query that may be executed by the data providing terminal 4, and an IP address of the data providing terminal 4. The information regarding a specific data providing terminal 4 may be designated as probe information. The probe information for the second query may include what type of sensor a sensor section 42 of the data providing terminal 4 is equipped with, together with what type of communication line and transmission speed are available to a terminal communicator 41 of the data providing terminal 4, as shown in FIG. 6.

The data providing terminal 4 transmits a position of the data providing terminal 4 to the server 3 periodically, and both the latest, current position of the data providing terminal 4 together with the previous, past position(s) are saved with the terminal ID in the data saver 321. The latest position of the data providing terminal 4 and the past position(s) may also be a part of the probe information. The history of the past position(s) refers to the travel/movement history of the data providing terminal 4. A vehicle speed may be computable from the history of the position(s) and the vehicle speed may be contained in the probe information.

The information for determining whether a data providing terminal 4 corresponds to and satisfied the receiver terminal requirements is also saved in the data saver 321. The afore-described probe information may be, for example, the type of sensor with which a data providing terminal 4 may be equipped. The latest position of the data providing terminal 4 may also be used to determine whether a data providing terminal 4 corresponds to the receiver terminal requirements. The information for the second query can also be used to determine which of the data providing terminal(s) will receive the second query. The data that is transmitted to the server 3 from the data providing terminal 4 after the second query is executed may also be saved by the data saver 321.

The query correspondence table memory 322 stores a query correspondence table and the terminal requirements correspondence table memory 323 stores a terminal requirements correspondence table. The query correspondence table is a table that establishes a correspondence between the first query and the second query. The terminal requirements correspondence table is a table that establishes a correspondence between the first query and the receiver terminal requirements.

The query correspondence table and the terminal requirements correspondence table are prepared regardless of whether a user device 2 transmits a first query or not. The query correspondence table and the terminal requirements correspondence table are either updated on demand by an administrator of the server 3 or updated periodically.

[Terminal Requirements Correspondence Table]

An example terminal requirements correspondence table is illustrated in FIG. 4 and described with reference to FIG. 4. The server 3 determines the data providing terminal 4 to which the second query is transmitted based on this terminal requirements correspondence table.

The first query is a user data request from the remote monitor 2 (i.e., the user device 2) that includes the data requirements. That is, the first query defines what kind of requirement(s) the user-requested data must satisfy. The user-request data or "object data" may be defined by an attribute and a requirement for the attribute. The requirement for a certain attribute may be designated as an object data requirement or requirements. The requirement may also be designated as a condition. The first query is a request that includes an object data requirement and processing instructions for the object data. The processing instructions for the object data may also be referred to as an "object process."

With reference to FIG. 4, the first query is described based on an example of the first entry, i.e., No. 1, of the terminal requirements correspondence table shown in FIG. 4. The first query under entry No. 1 relates to the object process of transferring data to the query requester. The requirements for two attributes are provided as the object data requirements in the first query under entry No. 1. The first attribute is a data type and a requirement for the first attribute is an image. The second attribute is a target position and a requirement for the second attribute is an intersection "X" or "INTXN," as shown in FIG. 4. The target position means a position captured in the image, or in other words, the position of the captured image. The object data requirements of the first query under entry No. 1 are the requirements of the image data and the position relating to intersection X. Although the intersection X may be represented by coordinates, for example, by GPS coordinates, it is assumed in the present exemplary embodiment that intersection X may be represented by name. When map data is available, if the name of intersection X is known, the position of the intersection X for the required attribute can be obtained by coordinates. As such, the coordinate position of intersection X, when intersection X can be identified by name, is an attribute that may be identified from map data.

As shown in the terminal requirements correspondence table in FIG. 4, the first attribute is designated as ATTR1 and the requirement of the first attribute is designated as REQ1. Like designations are applied to the second and third attributes and their corresponding requirements in FIG. 4 and in other drawings.

The first query under entry No. 2 of the table is the same as the entry under No. 1. The object process of the first query under entry No. 3 is the same as that of entry No. 1, but the object data requirements of entry No. 3 differ from entry No. 1. The object data requirements of the first query under entry No. 3 are defined as requirements for three attributes. The first attribute is a data type and the first requirement is an average travel speed or "AVG TRV SPD," as shown in FIG. 4. The second attribute is a position area and the second requirement is a circle with a 100 m radius centered on the intersection X. The third attribute is time and the third requirement is a time value t.

The receiver terminal requirements are requirements for a data providing terminal 4 that receives the second query. The receiver terminal requirements may include a terminal type, for example, a camera type terminal or terminal type "C," as shown in FIG. 4. Besides having a terminal type as one of the requirements, the exemplary embodiment of FIG. 4 shows requirements for two other attributes.

As for the receiver terminal requirements under entry No. 1, the C terminal type is specified as a C1 terminal type. The terminal type C1 means the data providing terminal 4 has a front camera 421, as shown in FIG. 6. With reference again to FIG. 4, the first attribute in the receiver terminal requirements of entry No. 1 is the latest position of the subject vehicle or "LATEST CAR POS," as shown in FIG. 4. The requirement for the first attribute is within a circle having a 100 m radius centered on the coordinates (a, b) of the intersection X.

Being within a circle having a 100 m radius centered on the coordinates (a, b) of the intersection X is determined as the latest position of the vehicle or the map range from which the object data (i.e., an image of the intersection X) requested by the first query is obtained. Instead of specifying an area with a 100 m radius, the requirement may be specified as a viewable range of the front camera 421. When a requirement is specified as a viewable range, the viewable range of the front camera 421 is obtained in advance from each of the data providing terminals 4.

The second attribute is the position of the subject vehicle one second before the latest position or "1 SEC-BEFORE CAR POS," as shown in FIG. 4. The requirement for the second attribute may be that the one second before the latest position of the subject vehicle is farther away from the coordinates (a, b) of the intersection X than the latest position of the subject vehicle relative to the coordinates (a, b) of the intersection X. In other words, the second requirement for the receiver terminal requirements under entry No. 1 means that the subject vehicle should be approaching the coordinates (a, b). The requirement for the second attribute may be defined, for example, where y(0) is the latest position of the subject vehicle, y(−1) is the one second before position of the subject vehicle, and x is the position of the intersection X, when $|y(0)-x| \leq |y(-1)-x|$ is satisfied.

As for the receiver terminal requirements of the entry No. 2, a terminal type C2 is specified as the C terminal type. Terminal type C2 means that the data providing terminal 4 is also provided with a rear camera 422, as shown in FIG. 6, in addition to the front camera 421. With reference to FIG. 4, the first attribute and its requirement in the receiver terminal requirements of the entry No. 2 entry are the same as those under the No. 1 entry. However, entry No. 2 neither defines a second attribute nor a requirement for the second attribute. The reason for not defining a second attribute or a requirement for the second attribute is that, when a vehicle is equipped with both front and rear cameras, it is probable that an image capturing the intersection X may be obtained even when the vehicle is traveling in a direction away from the intersection X, that is, away from the coordinates (a, b) of the intersection X.

The C type terminal is not specified in the receiver terminal requirements for the No. 3 entry. This is because the data providing terminal 4 that corresponds to the No. 3 entry is assumed to be capable of obtaining its own position. The server 3 may be setup to register or store in advance, information regarding a second query that is executable by the data providing terminal 4 together with a terminal ID of the data providing terminal 4. That is, in the present embodiment, it is assumed that a position of the terminal 4, as obtained by the terminal 4 itself, is used as a condition to register the information of the terminal 4 to the server 3.

In the receiver terminal requirements for the No. 3 entry, the requirements for two attributes are specified. The first attribute is a position and the requirement for the first attribute is a circle with a radius of 100-m position accuracy centered on the coordinates (a, b) of the intersection X or "100-m RADIUS CIRCLE ON X," as shown in FIG. 4. In the first query, since a circle of 100 m radius centering on X is specified as the second requirement under entry No. 3, in order to strictly limit the position of the data providing terminal 4 to be within a circle of 100 m radius centering on X, a value derived by subtracting a position error from 100 m radius is used as the receiver terminal requirement for the position of the terminal 4 under the first requirement of entry No. 3.

Under entry No. 3, the second attribute and the second requirement for the receiver terminal requirements are the same as the third attribute and the third requirement of the first query, that is, an attribute of time with the requirement of a time value t. Therefore, in order to determine whether the receiver terminal requirements are satisfied, a position of the data providing terminal 4 at time t may be calculated. The server 3 obtains the position of the data providing terminal 4 on demand or periodically, as the probe information. However, since the cycle or interval for obtaining data is discrete, the position of the data providing terminal 4 at time t may not have been obtained. When the position of the data providing terminal 4 at time t has not been obtained, such position may be calculated by an interpolation of two positions before and after time t, which may be obtained from the probe information. The position, as used in this paragraph, means data corresponding to the receiver terminal requirements.

In the receiver terminal requirements of the No. 1 and the No. 2 entries, a fill rate score is included. A fill rate score is a value quantifying a degree of fulfillment or degree of satisfaction of at least one requirement included in the receiver terminal requirements. A requirement evaluated and quantified in the present embodiment for the fill rate score may be the first requirement of the receiver terminal requirements.

The fill rate score for the No. 1 entry is represented as $1/\{\max(10\ m, |y-x|)\}$. In this equation, y is the latest position of the subject vehicle, x is the position of intersection X, and max means that the greater of one of the two values in the parentheses is taken. Therefore, the denominator of the above equation for calculating a fill rate score is a value of the greater of 10 m or the distance from the latest position of the subject vehicle to the position of intersection X, as defined by the coordinates (a, b). The reason why the distance from the latest position of the subject position to the coordinates (a, b) is compared with 10 m, takes into account that it may be difficult to capture an image of the intersection X when the position of the subject vehicle is too close to the coordinates (a, b).

The fill rate score in No. 2 entry is represented as $2/\{\max(10\text{ m}, |y-x|)\}$. The difference between the fill rate score equation for the No. 2 entry and the No. 1 entry is that the numerator is changed from 1 to 2. In the receiver terminal requirements for the No. 2 entry, the C terminal type C2 means that the requirement-satisfying terminal is provided with the front camera 421 and the rear camera 422. Therefore, compared with the requirement for the No. 1 entry using only the front camera 421, a possibility of satisfying the receiver terminal requirements doubles for the No. 2 entry. Therefore, the equation for calculating a fill rate score for the No. 2 entry is double the fill rate score of the No. 1 entry to reflect the use of two cameras under the No. 2 entry.

The two example fill rate scores in FIG. 4 will take greater values as the denominators in each of the two fill rate score equations decrease. For example, if a minimum value is used in the denominator instead of using the maximum value, the fill rate score will increase as the denominator decreases. Therefore, if the latest position of the subject vehicle is near the intersection X, the fill rate score may have a higher value the closer the vehicle is to the intersection X. The fill rate score may be used to determine and limit the number of data providing terminals 4 to which a second query is transmitted. The number of the terminals 4 may be predetermined specifically for each first query or may be based on the data type in the first query.

[Query Correspondence Table]

With reference to FIG. 5, a query correspondence table is described. A query correspondence table is a table that establishes correspondence between the first query and the second query. The second query is a data request for obtaining data from the data providing terminal 4. The second query may include an attribute that enables the data providing terminal 4 to identify the terminal data. The terminal data may either be the user-requested data of first query or data from which the user-requested data may be derived. The second query is transmitted to the data providing terminal 4. The data from which the user-requested data may be derived may not be limited to one data type, but may be a combination of two or more data types.

The first query may not be expressed by an equation that may be executed or is readily understandable by every data providing terminal 4. Therefore, the first query is not transmitted directly to the data providing terminal "as is," but rather, a second query may be provided by the server 3 based on the first query to enable the data providing terminal 4 to identify the user-requested data in the first query by using an attribute in the second query that may be executed and understood by the data providing terminal 4. A second query may also include the object data and the object process.

An example second query is shown in FIG. 5. Each of the second queries under entries No. 1 to No. 3 provides an object process to the server 3.

For example, as shown in FIG. 5, each of the entries No. 1 to No. 3 has an object process of transmission or "SEND." For the No. 1 entry of the second query, the object data requirements define requirements for two attributes. The first attribute is a sensor type and the first requirement corresponding to the first attribute is a front camera or "F CAM," as shown in FIG. 5. The second attribute is a position of the subject vehicle or "CAR POS," as shown in FIG. 5. The second requirement corresponding to the second attribute is that the position of the subject vehicle is within a viewable range of the intersection X before the subject vehicle reaches the intersection X, i.e. a target position, shown as "IN-VIEW RANGE BEFORE X" in FIG. 5. The viewable range is a preset range for distance and viewing angle that may be determined based on preset factors such as camera performance. The performance factors of the camera 421 may include camera resolution, lens f value, and the like. Other preset factors may include the weather conditions, light level, etc.

The number of data providing terminals 4 to which the second query is transmitted may be first narrowed based on the terminal requirements correspondence table, as described with reference to FIG. 4. The number of data providing terminals 4 that may receive the second query may be further narrowed based on the query correspondence table as described with reference to FIG. 5. For example, as shown in FIG. 5, the No. 1 entry of the second query is transmitted only to the data providing terminal(s) 4 that are approaching intersection X based on the second requirement limiting the subject vehicle position to a position "before" (i.e., approaching) the intersection X.

The No. 2 entry of the second query may also define requirements for two attributes under the object data requirements. For example, the first attribute may be a sensor type and the first requirement corresponding to the first attribute may be a camera facing intersection X for the front camera 421 and the rear camera 422 of the vehicle 5.

The second attribute may be a position of the subject vehicle and the second requirement corresponding to the second attribute may be that the position of the subject vehicle is within a viewable range relative to the coordinates (a, b) of the intersection X. That is, that the intersection X is within a viewable range of the subject vehicle's current position. Because the vehicle 5 in the example under entry No. 2 uses both the front camera 421 and the rear camera 422, the second requirement is within a viewable range "of" X in contrast to the second requirement under entry No. 1 specifying a viewable range "before" intersection X where only the front camera 421 is used.

The object data requirements of the second query under entry No. 3 may also define requirements for two attributes. The first attribute may be an object data type. For example, the object data type may specify the data type to be transmitted or "SEND OBJ. DATA TYPE," as shown in FIG. 5. The first requirement corresponding to the first attribute under entry No. 3 is a travel speed or "TRV SPD," as shown in FIG. 5. This requirement of "travel speed" is simply defined as "speed" without specifying a sensor type, which means that the speed (or speed data) may be obtained from a variety of vehicle sensors. For example the vehicle speed may not only be determined by a vehicle speed sensor, but may also be derived from an acceleration sensor (i.e., as the integral value of acceleration), or derived from a tire rotation speed sensor. Speed may also be derived from a GPS signal received by a GPS signal receiver that may be used to calculate a travel speed based on the Doppler effect. The "travel speed" requirement for the second query is different from the average travel speed requested by the first query, for example, as shown under the No. 3 entry in FIG. 5. There is a difference between travel speed and the average travel speed, because the server 3 performs an averaging process. The data requested in the second query under entry No. 3 is data from which an average travel speed may be derived and that data is the user-requested data of the first query. Under entry No. 3, the second attribute and the corresponding second requirement under the second query are the same as the third attribute and third requirement under the first query. That is, the attribute is time and the requirement is a time value t.

Although a position area is specified in the first query of No. 3 entry, there are no requirements for position in the corresponding second query. This is because the receiver terminal requirements have already taken the position requirement into consideration, for example, as shown under the No. 3 entry for the receiver terminal requirement in the terminal requirements correspondence table in FIG. 4.

Although the terminal requirements correspondence table of FIG. 4 and the query correspondence table of FIG. 5 were explained as two separate tables, both tables may be combined as one table. That is, both of the query correspondence table and the terminal requirements correspondence table have the first query column, and by having this common column, the two tables are combinable to make one table.

[Function of the Control Section]

With reference again to FIG. 3, the control section 33 may be a computer having a CPU, ROM, RAM, and like components. The CPU may execute a program stored in a non-transitive, substantive storage media, such as ROM, while utilizing a temporary storage function of RAM, to serve as a first query obtainer 331, a receiver terminal determiner 332, a second query determiner 333, and a data processor 334.

The afore-mentioned program may be stored in a non-transitive, substantive storage medium, and the storage may not be limited to ROM. That is, for example, a program may be saved in a flash memory. Further, the execution of the program by the CPU may cause the CPU and other hardware to perform the steps of a corresponding method, perform a corresponding algorithm, execute a corresponding instruction set, or the like.

The functional blocks of the control section 33 may be realized either in part, or as a whole, by using one or more ICs or the like (i.e., in other words, the functional blocks may be realized as hardware). The functional blocks of the control section 33 may be realized either in part, or as a whole, by a combination of software (i.e., software executed by CPU) and hardware (i.e., ICs or the like).

The first query obtainer 331 obtains the first query from the server receiver 312, when the first query is transmitted from the remote monitor 2 and received by the server receiver 312.

The receiver terminal determiner 332 determines a receiver terminal requirement, or requirements, from the first query of the first query obtainer 331. The receiver terminal requirement determination is performed by using the terminal requirements correspondence table stored in the terminal requirements correspondence table memory 323. That is, the first query obtained by the first query obtainer 331 is looked up in the terminal requirements correspondence table, and if a match if found for the first query, the receiver terminal requirements corresponding to the first query in the table are used to determine a receiver terminal.

When the first query is not included in the terminal requirements correspondence table, i.e., no match, the first query is analyzed to determine the object processes and the object data in the first query. The receiver terminal requirements may be determined by the object processes and the object data. The first query analysis may analyze the object processes and the object data one by one to determine the receiver terminal requirements. The receiver terminal requirements may also be determined based on the contents of the second query.

After determining the receiver terminal requirements, the receiver terminal determiner 332 then determines which data providing terminal 4 will receive the second query based on the receiver terminal requirements. As mentioned previously, the information for determining whether each of the data providing terminals 4 corresponds to or satisfies the receiver terminal requirements is saved in the data saver 321. The receiver terminal determiner 332 determines which data providing terminal 4 will receive the second query based on the information saved in the data saver 321. That is, the receiver terminal determiner 332 determines which data providing terminal 4 will be the receiver terminal based on which terminal 4 satisfies the receiver terminal requirements of first query.

When the fill rate score is included in the receiver terminal requirements and the number of the data providing terminals 4 satisfying the receiver terminal requirements is greater than what is specified, the fill rate score may be used to limit the number of data providing terminals acting as receiver terminals, the required number of terminals 4 may be determined in a descending order of the fill rate score from among the terminals 4 satisfying the receiver terminal requirements.

The second query determiner 333 determines the second query from the first query obtained by the first query obtainer 331 and the query correspondence table stored in the query correspondence table memory 322.

When the first query is not included in the query correspondence table, the object process and object data requested by the first query are represented by the second query, in order to determine the second query to be sent to the data providing terminal 4.

The data processor 334 performs the object process determined by the first query to process the object data, if the data providing terminal 4 transmits such object data. When the object process is a transfer process to the query requester, the object data received from the data providing terminal 4 is transferred to the user device 2 that originated the first query.

The data processor 334 saves the object data in the data saver 321 to process future first queries. Object data may be saved in the data saver 321, and a save period of such data is a predetermined amount of time.

[Configuration of the Data Providing Terminal]

As shown in FIG. 6, the data providing terminal 4 is provided with the terminal communicator 41, the sensor section 42, an accumulator 43, and a control section 44. The terminal communicator 41 has a terminal transmitter 411 and a terminal receiver 412. The terminal transmitter 411 performs wireless transmission of data to an external device, such as the server 3. The terminal transmitter 411 may also transmit data to a user device 2 or to other data providing terminal(s) 4. Data transmitted by the terminal transmitter 411 may include the object data that is obtained by the execution of the second query. The position of the subject vehicle, that is, the position of the data providing terminal 4, may also be transmitted from the terminal transmitter 411.

The terminal receiver 412 receives data transmitted wirelessly from an external device. Data received by the terminal receiver 412 may be a second query transmitted from the server 3.

The terminal communicator 41 uses one or more wireless communication methods such as a telephone network (e.g., LTE) or a public wireless LAN or the like. The telephone network may either be MNO (Mobile Network Operator) or MVNO (Mobile Virtual Network Operator). Both MVNO and MNO may be used by the terminal communicator 41.

The sensor section 42 is provided with various sensors. The sensor section 42 shown in FIG. 6 is provided with the front camera 421, the rear camera 422, an acceleration sensor 423, a speed sensor 424, and a position detector 425. The aforementioned sensors are an example of sensors that may be used with the exemplary embodiment. That is, some of these sensors may be omitted, while other sensors may also be used.

The front camera 421 captures a front image ahead of the vehicle 5. The rear camera 422 captures a rear image behind the vehicle 5. The acceleration sensor 423 detects an acceleration of the vehicle 5. The speed sensor 424 detects a speed of the vehicle 5. The position detector 425 detects a current position of the vehicle 5.

The accumulator 43 is provided with a non-transitive, substantive storage such as a flash memory or like storage, to which data can be written. The accumulator 43 accumulates the object data obtained by the execution of the second query.

The control section 44 is provided with a communication controller 441 and a data obtainer 442. The communication controller 441 controls the terminal communicator 41 and transmits and receives data.

When the terminal receiver 412 receives the second query, the data obtainer 442 executes the second query, if executable, and obtains the object data from the sensor section 42. Even if the second query is executable at the time of reception, a second query that includes a position requirement may no longer be executable after a certain amount of time from when the second query is received. That is, the second query may have a limited amount of time in which it may be executed. As such, a second query may have an executable period as a condition for execution.

In cases where the second query has already been executed and the object data requested by such second query is already accumulated in the accumulator 43, the object data may be obtained from the accumulator 43.

When the data obtainer 442 has obtained the object data, the communication controller 441 transmits, from the terminal transmitter 411, the object data to a device determined by the second query. When two or more wireless communication methods are available, the terminal communicator 41 may transmit the object data by using a wireless communication method that can transmit data using the least expensive communication method. The data obtainer 442 accumulates the object data in the accumulator 43, in cases where the object process determined by a second query is an accumulation of object data.

[Process Performed by the Control Section of the Server]

The process performed by the control section 33 is described with reference to FIGS. 3 and 7. The control section 33 may perform the process shown in FIG. 7 periodically.

At S1, the first query obtainer 331 determines whether the first query is received. If no first query is received (i.e., NO at S1), the process proceeds to S8. If a first query is received (i.e., YES at S1), the process proceeds to S2.

At S2, the data processor 334 determines whether the object data requested by the first query has already been saved in the data saver 321.

At S3, the second query determiner 333 determines whether there is any reception plan of the object data requested by the first query. As illustrated in FIG. 5, the first query is different from the second query and two different first queries may result in the same second query. Thus, in S3, the second query determiner 333 determines whether there is any plan to receive the object data requested by the first query, based on the transmission history of the already-transmitted second queries. If there is a plan to receive the object data (i.e., YES at S3), the process proceeds to S8, and if there is no plan to receive the object data (i.e., NO at S3) the process proceeds to S4. At S4, the second query determiner 333 determines the second query from the first query.

The receiver terminal determiner 332 performs S5-S7. At S5, the receiver terminal determiner 332 determines the receiver terminal requirements from the first query. At S6, the receiver terminal determiner 332 determines a second query destination, that is, a data providing terminal 4 to which the second query is transmitted. The receiver terminal determiner 332 determines the second query destination from the receiver terminal requirements determined at S5 and based on information about each of the data providing terminals 4 saved in the data saver 321. After the data providing terminal 4 is determined at S6, the second query is transmitted to the data providing terminal 4 at S7.

At S8, the data processor 334 determines whether the object data has been received from the data providing terminal 4. If the object data has not been received (i.e., NO at S8), the process shown in FIG. 7 ends. If the object data has been received (i.e., YES at S8), the process proceeds to S9. At S9, the data processor 334 transfers the received object data or the already-saved object data to the user device 2 originating the first query. At S9, the data processor 334 performs the object process of the first query. If the object process is not a data transfer to the query requester, then the data processor 334 performs the process specified as the object process in the first query at S9.

At S10, the data processor 334 saves the received object data in the data saver 321. Additionally, the data processor 334 may delete already saved object data (i.e., expired data) from the data saver 321.

[Summary of the Present Embodiment]

Even when obtaining a request that the target position is the intersection X, the data providing terminal 4 may not understand that the target position is the intersection X from such request. Additionally, it may be difficult for the remote monitor 2 to generate, for each of the data providing terminal 4, a data request using an expression understood by all of the data providing terminals 4.

When the remote monitor 2 attempts to obtain an average travel speed at a position close to the intersection X, it may be difficult to obtain the average travel speed. There may be difficulties in identifying the data providing terminals 4 existing near the intersection X, difficulties in sending a request to each of the identified data providing terminals 4 to transmit a travel speed, and difficulties averaging the travel speeds obtained from the terminals 4.

In the present embodiment, when the remote monitor 2 transmits a first query to the server 3, the server 3 determines a second query from the first query, which specifies the object data requested by the first query by using an attribute that enables the data providing terminal 4 to identify such data. Then, the second query is transmitted to the data providing terminal 4. Therefore, it is not necessary for a user using the remote monitor 2 to request data to provide data specifics, such as, by using an attribute that enables the data providing terminal 4 to identify such data. As such, the remote monitor 2 can easily obtain the user-requested data.

<Second Embodiment>

The hardware configuration of the data delivery system in the second embodiment may be the same as the first embodiment. However, the second embodiment may implement a different first query, a different second query, and different receiver terminal requirements than the first embodiment.

In the first embodiment, when the remote monitor 2 transmits the first query under entries No. 1 or No. 2 to the server 3, the image data of the intersection X is transferred in real time from the data providing terminal 4 back to the server 3 or other device. In such manner, the intersection X may be monitored in real time by the remote monitor 2.

However, when the frame rate of an image capture device of the data providing terminal 4 is low, and/or when the processing time for the image transfer is long, there may be difficulty with real time monitoring. In addition, when a communication speed of a wireless communication channel is low, there may be difficulty with real time monitoring.

In some instances, the user of the remote monitor 2 may not be able to easily specify the parameters affecting the real time monitoring (i.e., the frame rate, the image transfer time, the communication speed of wireless communication channel, etc.) in the first query.

The first query may use a time-specific requirement, other than real time monitoring, for processing the object data. That is, the requirement corresponding to the data attribute in the first query may be time related to specify the process timing of object data.

The second embodiment describes exemplary execution requirements included in the first query. The execution requirements are requirements corresponding to the data attribute related to the processing time or duration for processing the object data. An exemplary query correspondence table for the second embodiment is shown in FIG. 8. As shown in FIG. 8, the object process and the object data requirements are omitted under the second query column in contrast to the exemplary query correspondence table shown in FIG. 5. In FIG. 8, the first query under entry No. 4 has the same object process and object data requirements as those of the No. 1 entry described in FIG. 5. As such, the object process and the object data requirements of the second query for the No. 4 entry, though not shown in the query correspondence table of FIG. 8 are the same as the object process and the object data requirements for the second query under entry No. 1, as shown in FIG. 5.

As shown in FIG. 8, the previously described execution requirements are included in the first query. The execution requirements in the first query under the No. 4 entry define the requirements for two attributes. The first attribute is a purpose (i.e., purpose of use) and the first requirement corresponding to the first attribute is real time monitoring.

The process requirements of the second query shown in FIG. 8 are the requirements for the data attribute that are determined by and correspond to the execution requirements of the first query. The process requirements in the second query under the No. 4 entry define requirements for three exemplary attributes. The first attribute is a wireless communication channel speed or "WIRELESS CH. SPD," as shown in FIG. 8. The first requirement corresponding to the first attribute is that the speed needs to be higher than 5 Mbps (i.e., 5 Mbit/s). The second attribute is a frame rate and the second requirement corresponding to the second attribute is that the frame rate be higher than 10 fps, that is, the image capture device needs to capture an image, for example a video, with more than 10 frames per second. The second requirement defines a frequency of data delivery (i.e., a frequency of obtaining user-requested data). The third attribute is a transfer delay and the third requirement corresponding to the third attribute is that the transfer delay is shorter than 1 second. The transfer delay may be the time it takes to process the image data after the image data is capture before the image data may be transmitted. If the three requirements are satisfied, the image data may be transmitted to a transmission destination relatively quickly with only a minimal delay. As such, real time monitoring, which is an execution requirement of the first query, is enabled.

A fill cost may be included in the process requirements of the No. 4 entry. The fill cost may be a communication cost or data-usage cost, i.e., a fee or charge of the communication channel. The fill cost may be a product of a per-bit price of a charged communication channel and a channel use time. The channel use time is determined based on the distance traveled while the communication channel is in use and a travel speed. A communications resource map may be used to determine whether each position of the subject vehicle is a use position for the purposes of determining communications charges/fees. The communication resource map may show positions where a communication channel may be used free of charge. The communication resource map data may be predetermined and saved to the data delivery system described by the second embodiment. Such resource data may be obtained from a resource mapping company, a communications service provider, and the like.

The No. 5 entry lists an object process "SAVE" under the first query. "SAVE" means that the object data may be saved in a memory medium disposed in the data providing terminal 4 for later use.

The object data requirements for the No. 5 entry include two attributes. The first attribute is a data type and the first requirement corresponding to the first attribute is that voice data needs to be provided in an MP3 format. The second attribute is a target position and the second requirement corresponding to the second attribute is that the target position is the intersection X.

The execution requirements for the No. 5 entry define requirements for two attributes. The first attribute is "save time" and the first requirement corresponding to the first attribute may be defined as "period T." "Save time" relates to how long the object data is saved or retained in the memory medium. The second attribute is a data rate and the second requirement corresponding to the second attribute is that the data rate needs to be greater than "w" kbps. The execution requirements of the No. 5 also include a time-related attribute, i.e., the save time.

The process requirements of the second query that correspond to the execution requirements of the No. 5 entry include a first attribute related to a storage capacity with a first requirement of storage capacity greater than wT. The execution requirements of the first query are defined as "save time T" and "data rate higher than w," which means that the required amount of data storage capacity must be at least greater than the product of "T" and "w."

[Example Process of the Control Section]

Figure 7:
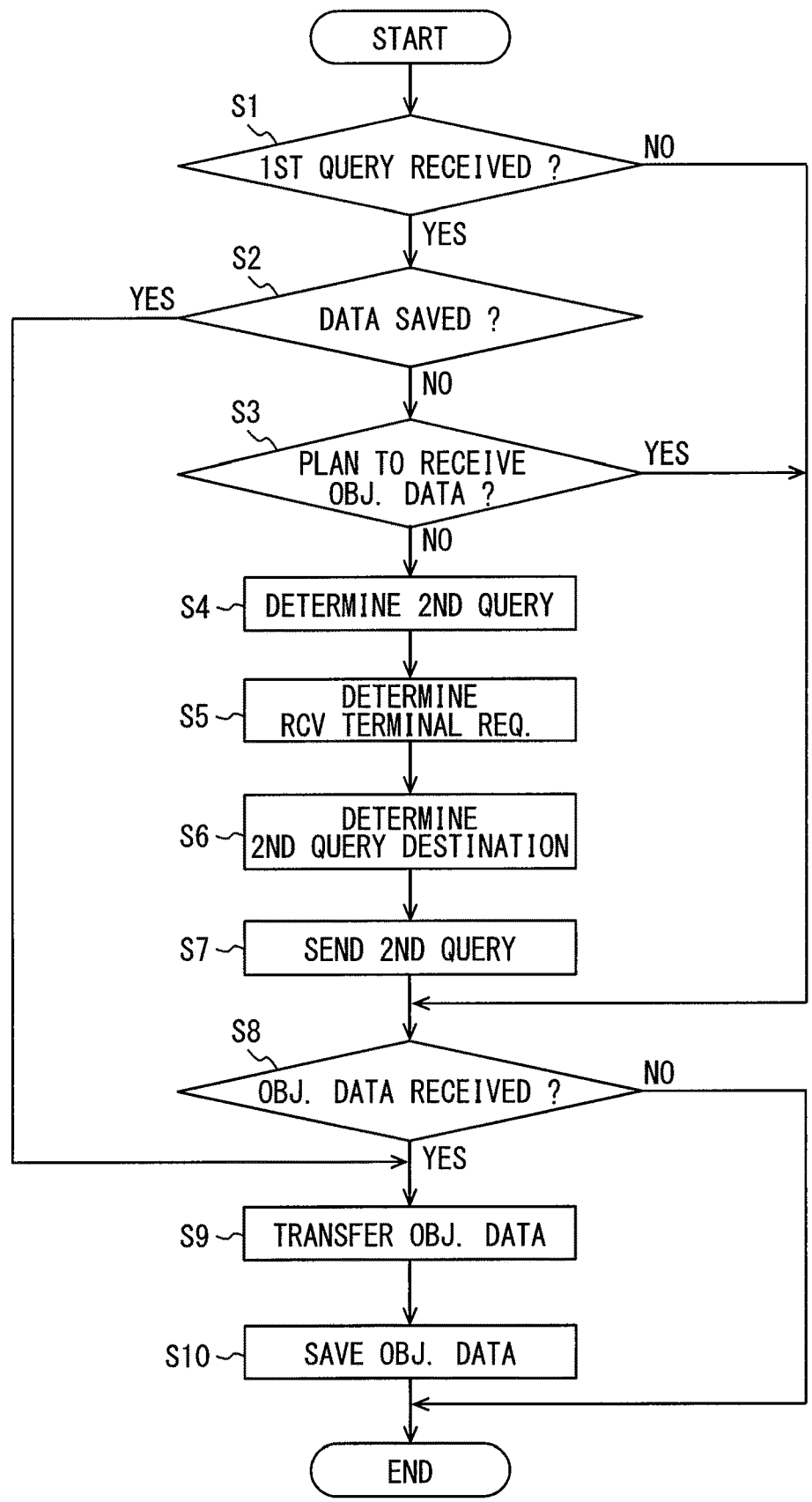
FIG. 7 is a flowchart of a process performed by a server control section.

With reference to FIG. 7, an example process of the control section 33 is described where the first query under the No. 4 entry is transmitted from the remote monitor 2 to the server 3.

At S1, when the remote monitor 2 transmits the first query under entry No. 4 to the server 3, and the server 3 receives the first query, (i.e., YES), the process proceeds to S2. Here, it is assumed that the object data has not yet been saved and that no reception plan for receiving the object data exists. Based on this assumption, both of the determinations at S2 and S3 branch to NO, and the process proceeds to S4. At S4, the second query determiner 333 determines the second query for the No. 4 entry shown in FIG. 8.

At S5, the receiver terminal 332 determines the receiver terminal requirements. The receiver terminal requirements determined at S5 for the No. 4 entry are the receiver terminal requirements of the No. 1 or No. 2 entries, as shown in FIG. 4. Additionally, the requirement that an upload communication speed be greater than 5 Mbps may be added. "Upload" in this context means communication from the terminal 4 to the server 3. If the upload communication speed requirement is added, the likelihood of transmitting the second query to a data providing terminal 4 that does not satisfy the process requirements of the second query is reduced.

At S6, the receiver terminal determiner 332 determines the data providing terminal 4 satisfying the receiver terminal requirements determined at S5. That is, the receiver terminal determiner 332 determines the second query transmission destination, i.e., a receiver terminal. In order to effectuate the process at S6 in the second embodiment, the probe information including a communication speed implementable by the terminal transmitter 411, a frame rate for the front camera 421 and the rear camera 422, and a transfer delay time may be saved in the data saver 321.

In instances where a large number of data providing terminals 4 are found to satisfy the receiver terminal requirements, the fill cost under the process requirements of the second query may be considered and used to limit the number of the terminals 4 serving as the receiver terminal. For example, the data providing terminal 4 with the lowest fill cost may be selected to serve as the receiver terminal. The number of data providing terminals 4 serving as receiver terminals may be set up in advanced for each first query and based, for example, on the data type, etc., in the first query.

At S7, the receiver terminal determiner 332 transmits the second query to the data providing terminal(s) 4 that are determined at S6. Since the processes of S8-S10 are the same for the second embodiment as the corresponding processes described in the first embodiment, the description of these processes is omitted.

In the present embodiment, when the execution requirements are included in the first query, the user device 2 fetching the user-requested data is further effectuated by including the process requirements based on the execution requirements in the second query.

<Third Embodiment>

The third embodiment includes a first query, a second query, and receiver terminal requirements that differ from those described in the first embodiment and second embodiments. In the third embodiment, the user device 2 may be a road abnormality detector. The road abnormality detector uses an image of the road that may be obtained either periodically or on demand to check the condition of the road and to detect road abnormalities.

The exemplary embodiment describes a situation where the road abnormality detector requests image data of the intersection X for 10 seconds from 9:00 to check and confirm the road condition. FIGS. 9 and 10 illustrate a first query transmitted from the road abnormality detector to the server 3. In the first query shown in FIGS. 9 and 10, the object process is a process that transfers object data, that is, the user-requested data, to the query requester, similar to the object process described in the first embodiment.

In this exemplary embodiment shown in FIGS. 9 and 10, the object data requirements may be based on three attributes. The first attribute and its first requirement and the second attributes and its second requirement are the same as those attributes and requirements under the object data requirements for the first query under entry No. 1, as shown in FIGS. 4 and 5. The third attribute and its third requirement are included in the object data requirements of the first query in FIGS. 9 and 10. The third attribute may be time and the third requirement corresponding to the third attribute may be a period of 10 seconds from 9:00 or "FOR 10 SEC FROM 9:00," as shown in FIGS. 9 and 10.

The execution requirements are also included in the first query. The execution requirements in this case may have an attribute designated as "use" and a corresponding requirement of a "road condition confirmation."

The receiver terminal requirements determined by the receiver terminal determiner 332 for the first query are shown in FIG. 9. FIG. 9 illustrates two rows of receiver terminal requirements that corresponding to one first query. The receiver terminal requirements may include a camera terminal type or "C TERM. TYPE," as shown in FIG. 9. Of the two rows under the receiver terminal requirements, the upper or top row may specify the C terminal type as terminal type C1 while the lower or bottom row may specify a C terminal type as terminal type C2. In FIG. 9, the C terminal types (i.e., C1 and C2) may be the same as the C terminal types described in reference to FIG. 4, that is, the terminal type C1 may be a data providing terminal 4 provided with the front camera 421, and the terminal type C2 may be a data providing terminal 4 provided with both the front camera 421 and the rear camera 422.

In the exemplary embodiment shown in FIG. 9, the receiver terminal requirements may also include three attributes and corresponding requirements. The first attribute may be a position of the subject vehicle and the first requirement corresponding to the first attribute may be specified as a position within 100 m from the coordinates (a, b) of the intersection X at 9:00. Both the upper row and the lower row include the same first attribute and first requirement.

The second attribute and second requirement are specified only for the receiver terminal in the upper row. The second attribute may specify "travel direction" and the second requirement corresponding to the second attribute may be is "approaching the coordinates (a, b) at 9:00" or "APPR. (a, b) AT 9:00". The second attribute and second requirement shown in FIG. 9 differs from the second attribute and the second requirement of the No. 1 entry in FIG. 4 only by the determination timing. That is, the determination timing may be specified as either "now," as in FIG. 4, or "at 9:00," as in FIG. 9. The receiver terminal of the lower row does not include the second attribute of "travel direction" with a corresponding second requirement for the same reason why the No. 2 entry of FIG. 4 does not include a second attribute and corresponding requirement, that is, because the data providing terminal 4 has the rear camera 422 in addition to the front camera 421.

The third attribute and corresponding requirement under the receiver terminal requirement may be defined by the same parameters for the terminals in the upper and lower rows of FIG. 9. The third attribute may be a communication speed and the third requirement corresponding to the third attribute is either that the present communication speed is greater than 5 Mbps, or that the current position of the receiver terminal is within 1 km of wireless LAN communication area. Since the data type requested by the first query is the image data, the communication speed should be relatively high. Therefore, the third requirement specifies a communication speed higher than 5 Mbps. In addition to the communication speed requirement, the reason for the current position relative to a wireless LAN communication area, is because the data requested by the first query is not intended for immediate use. Therefore, data transmission may be performed sometime later. Additionally, the wireless LAN may provide sufficient communication speeds for transmitting the image data and may include low cost data transmission rates or be free. To determine whether the current position of the receiver terminal is within 1 km of a wireless LAN communication area, a communication area map of the wireless LAN may be used to determine if the condition is satisfied.

FIG. 10 illustrates a second query that is determined by the second query determiner 333 based on the first query. The first query shown in FIG. 10 is the same as FIG. 9. In FIG. 10, two second queries are shown (i.e., upper row and lower row.) The two second queries in FIG. 10 correspond to the two receiver terminal requirements shown in FIG. 9.

Each object process of the two second queries is a transmission to a server or "SEND TO SERVER," as shown in FIG. 10. Under the object data requirements, requirements are specified for three attributes. The first attribute and the corresponding first requirement in FIG. 10 are the same as the first attribute and the corresponding first requirement of the second query under entries No. 1 and No. 2, as shown in FIG. 5. The second attribute shown in FIG. 10 is the same as the second attribute of the second query for the No. 1 and No. 2 shown in FIG. 5. The second requirement for the second attribute is the same as the second requirement for the second query for entries No. 1 and No. 2 in FIG. 5, except that time is 9:00. The third attribute and the corresponding third requirement are the same as the third attribute and the third requirement of the first query in FIG. 10.

The second query shown in FIG. 10 may also define the process requirements. In the process requirements, a requirement of within 5 minutes is defined for the attribute of a transfer delay. This process requirement is determined based on the execution requirements defined in the first query. Since the execution requirements in the first query are confirming the road condition, it is not necessary to immediately transmit the image data. As such, a 5 minute transfer delay is used for the process requirement.

[Example Process in the Third Embodiment]

Next, an example process in the third embodiment is described. The road abnormality detector, i.e., a user device, transmits the first query shown in FIG. 9 and FIG. 10 to the server 3. When the server 3 receives the first query, i.e., YES at S1 of FIG. 7, the process proceeds to S2. When the object data has not yet been saved and there is no plan to receive the object data, the process proceeds to S4. At S4, the second query shown in FIG. 10 is determined. At S5, the receiver terminal requirements shown in FIG. 9 are determined.

At S6, the receiver terminal determiner 332 determines the data providing terminal 4 that satisfies the receiver terminal requirements determined at S5 as the transmission destination (i.e., the receiver terminal) of the second query. When there are too many receiver terminals, i.e., the number of the data providing terminals 4 satisfying the receiver terminal requirements of FIG. 9 is more than required, the number of data providing terminals 4 may be selected from those that have the possibility of reaching the wireless LAN area within 5 minutes. To limit the number of receiver terminals to those closest to the wireless LAN area, a travel plan of each terminal 4 may be collected from each of the terminals 4, and the collected travel plans may be stored as the probe information. From the travel history included in the probe information, a future travel path of the data providing terminal 4 may be predicted, and the possibility of reaching the wireless LAN area within 5 minutes may be estimated.

At S7, the second query is transmitted to the second query transmission destination (i.e., the receiver terminal) that is determined at S6. Since the process requirements are defined as "within 5 minutes," the data providing terminal 4 that received the second query searches for the least expensive communication method from among the available communication methods, which are capable of completing the data transfer within 5 minutes.

For example, when the data providing terminal 4 is expected to enter into the communication area of the wireless LAN within 3 minutes and has sufficient storage capacity, even if the object data to be transmitted is already saved in the memory medium, the data providing terminal 4 may wait until entering the wireless LAN area before transmitting the object data. However, even when the transmission of the object data is performed later, an execution plan of the transmitted (i.e., already-received) second query is sent to the server 3 in advance.

The data providing terminal 4 that satisfies the receiver terminal requirements is not always able to execute the second query. In instances where the data providing terminal 4 cannot execute the second query after receiving the second query, the data providing terminal 4 notifies the server 3.

When the data providing terminal 4 transmits the object data and the server 3 receives the object data, i.e., YES at S8, the object data is transferred to the road abnormality detector at S9. Thus, the road abnormality detector can obtain the image data of the intersection X, and the detector can evaluate the road condition of the intersection X based on the obtained image. The server 3 performs the process at S10 and temporarily saves the image data transmitted from the data providing terminal 4 in the data saver 321.

As shown in the present embodiment, the user device can obtain user-requested data, even if the user-requested data is past data.

<Fourth Embodiment>

According to the previously-described embodiments, the server 3 is described as capable of determining a second query from a first query. However, in some instances, the second query may not be able to be determined from the first query.

Figure 11:
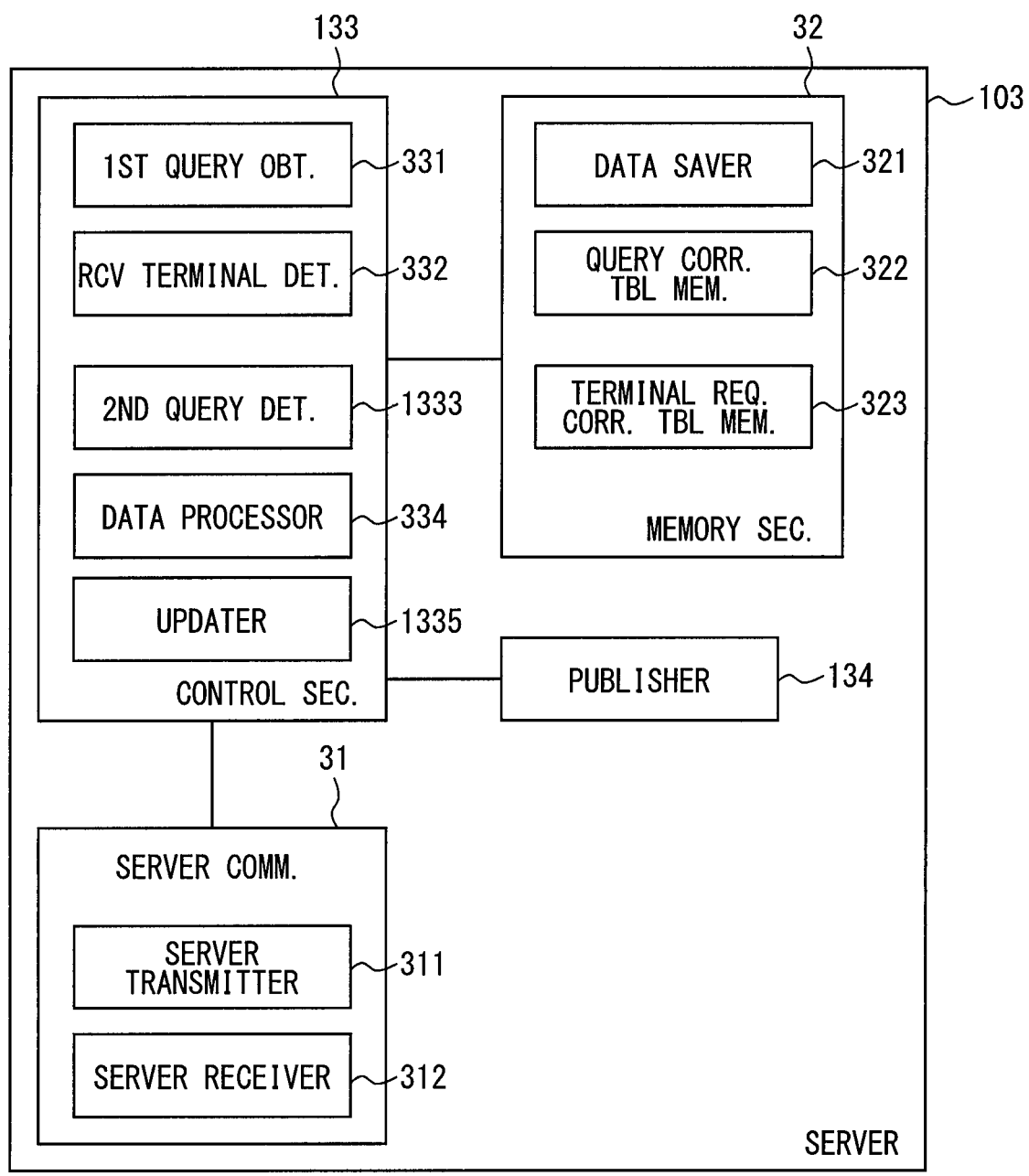
FIG. 11 illustrates a block diagram of a server configuration.

As shown in FIG. 11, a server 103 may include a publisher 134 that "publishes" a list of first queries from which a second query may be determined. The publisher 134 is a storage medium that may be accessed from an external device (i.e. a device outside of the server 103) via a communication channel, such as the Internet. Therefore, the user device 2 can access the publisher 134 and can recognize a first query to which the server 103 can respond.

A control section 133 of the server 103 is provided with an updater 1335. The updater 1335 is configured to update the first query published by the publisher 134. The server 103 is configured to respond to the updater 1335.

For the update process performed by the updater 1135 it is assumed in this exemplary embodiment, that the first query includes object data of a position of a specific vehicle and object data of an image of a specific position. It is further assumed in this example that the first query includes an object process for transferring the object data and an object process for saving the object data.

It is also assumed that a first query includes object data that includes an average travel speed at a specific position; an average wiper operation state at a specific position; a position and specific time at which a specific wiper operation state is observed; and a position and specific time at which a specific vehicle is observed.

The updater 1335 updates the first query to be the first query to which the server 3 can respond. The first query may further include object data that includes an image of a specific vehicle and specific time and an image that includes a specific position and specific time.

When the updater 1335 is provided, the user device 2 can increase the number of first queries published by the publisher 134 to which the server 3 can respond, to determine a second query. In such manner, the requests by a user using the user device 2, as defined in terms of the first query, may be more easily transmitted to the server 3. Further, use of the updater 1335 may limit the transmission of non-respondent first queries by the user device 2 to the server 3. That is, the updater 1335 may limit the transmission of first queries where the server 3 cannot determine second queries from the first queries.

The second query determiner 1333 of the control section 133 described in the fourth embodiment differs from the second query determiner 333 of the previously-described embodiments, as the second query determiner 1333 performs different processes than the second query determiner 333. The second query determiner 1333 of the present embodiment determines a stationary query as a second query. A stationary query is a data request to the data providing terminal 4, for obtaining data regardless of the first query. A stationary query is transmitted from the server transmitter 311 to the data providing terminal 4 that is capable of executing the stationary query. The transmission timing of the stationary query may be periodic or may be only once to each of the data providing terminals 4. As the second query determiner 1333 may repeatedly determine the stationary query and the server transmitter 311 may repeated transmit the stationary query, the stationary query may include a stop query to instruct the data providing terminal 4 to which the stationary query is transmitted to stop the execution of the stationary query. The stop query may be sent separately to the data providing terminals 4 from the stationary query (i.e., not included with the stationary query).

The stationary query corresponds to a first query published by the publisher 134. That is, the data that may be obtained using the stationary query can serve as the user-requested data of the first query. In other words, some of the first queries may be assumed and accommodated by the stationary queries. When a new stationary query is transmitted (i.e., used), the updater 1335 adds a new first query or queries to the publisher 134, as queries to which the server 3 can respond by using the new stationary query.

If the object process of a first query is "save", the stationary query also has "save" as the object process. If the object process of a first query is "transfer" the stationary query also has "transfer" as the object process. For the "transfer" process, the data transmission frequency is also specified by the stationary query. When the object process of a stationary query is "transfer" to the server 3 and a transmission frequency is specified, the object data is transmitted from the data providing terminal 4 to the server 3 at the transmission frequency. When the transmitted object data is the current position for determining the receiver terminal requirements, the server 3 does not have to obtain data from each of the data providing terminals 4 after receiving the first query to determine which of the data providing terminals 4 satisfies the receiver terminal requirements. In such manner, the data providing terminal 4 that satisfies the receiver terminal requirements can be determined faster.

The current position may be included as one item of the probe information. Therefore, the probe information may be updated by the server 3 periodically.

The object data, which is derived by an execution of the stationary query and is transmitted to the server 103, is temporarily saved in the data saver 321. This is because a user device to which this object data will be transferred has not yet been determined.

By transmitting a stationary query to the data providing terminal 4, the server 103 can quickly provide the user device with the object data requested by the first query, after the first query is obtained from the user device.

For example, the stationary query may be described as having an object process of "save" and an object data of an image captured by the front camera 421 at a frame rate of 10 fps. Since "save" means an accumulation of data, the data providing terminal 4 that receives this stationary query accumulates the object data specified by the stationary query in the accumulator 43.

The receiver terminal of the stationary query, that is, the data providing terminal 4 to which the stationary query is transmitted, is, for example, a terminal 4 that is capable of executing the stationary query at the transmission timing of the stationary query. The stationary query may also be transmitted to the data providing terminal 4 that may be able to execute a stationary query in the future due to a position change.

Whether to eventually execute a stationary query, or not, may be left to the disposal of the receiver terminal (i.e., the data providing terminal 4) and the stationary query may be transmitted to all of the registered data providing terminals 4. In such case, when a registration of a new data providing terminal 4 is performed, a stationary query is transmitted to a newly registered data providing terminal 4 upon registration. In such manner, the object data defined by the stationary query may also be obtained from the newly registered data providing terminal 4. A data providing terminal 4 not yet registered may transmit a message requesting to be registered to the server 103 and the server 103 can register such a data providing terminal 4.

<Fifth Embodiment>

Figure 12:
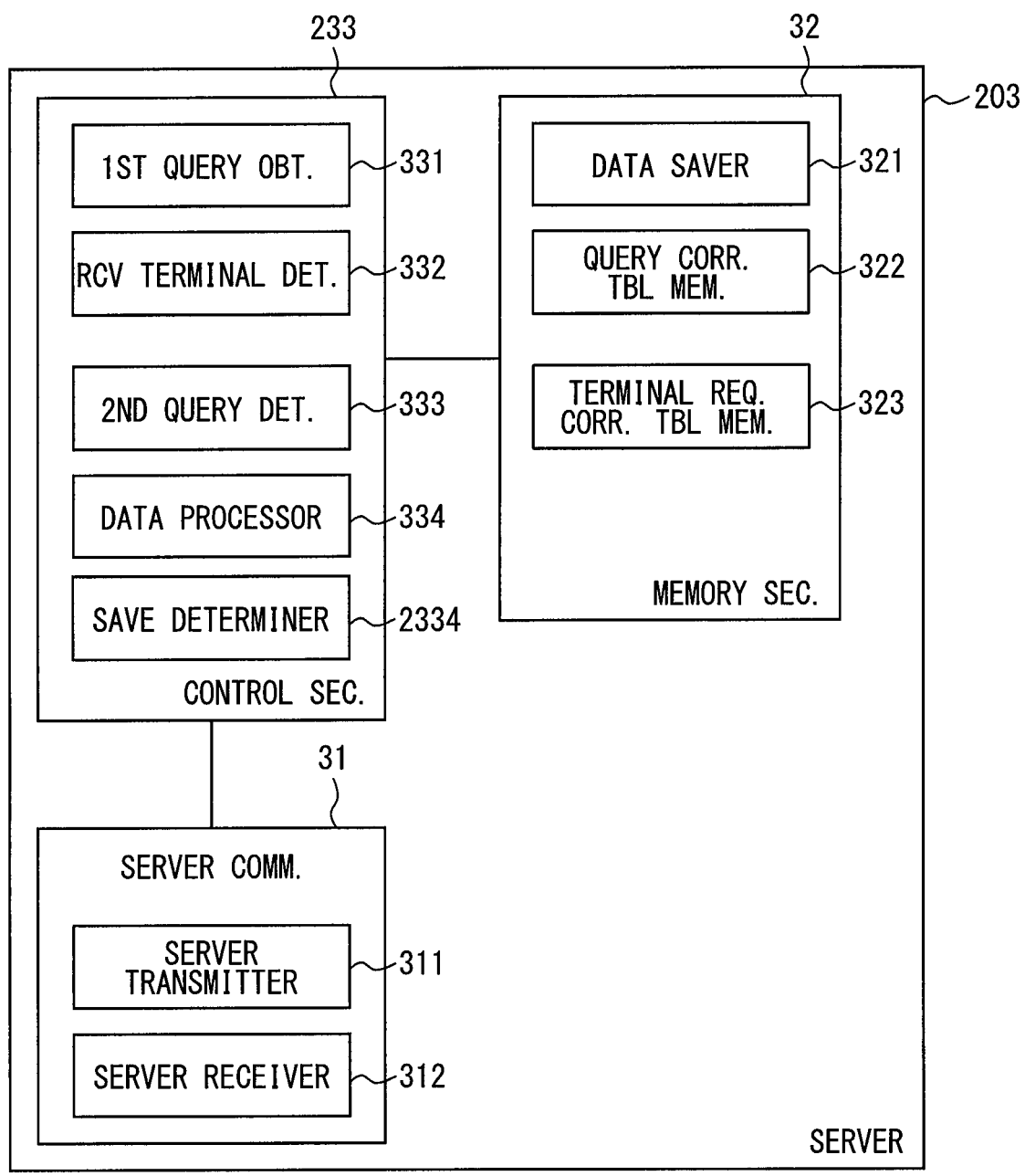
FIG. 12 illustrates a block diagram of a server configuration.

In the first embodiment, the server 3 saves object data transmitted from the data providing terminal 4 for a predetermined amount of time. However, a server 203 with a control section 233 of the fifth embodiment, as shown in FIG. 12, may be provided with a save determiner 2334 that determines whether to save the object data in the data saver 321.

In instances where many data providing terminals 4 may transmit the image data to the server 203, that is, when large amounts of data are transmitted to the server 203 in relatively short periods of time, the storage capacity of the data saver 321 may be exhausted. Thus, the save determiner 2334 may be used to determine whether the object data is saved in the data saver 321.

The save determiner 2334 determines the object data to be saved in the data saver 321 based on the transmission history of the object data to the user device 2. The save determiner 2334 may assume that certain object data with a higher number of transmissions to the user device 2 may have a higher value, and thus be more likely to be worth saving. Therefore, the save determiner 2334 may use the transmission history of the object data to the user device 2 to determine whether to save certain object data.

To determine which object data is to remain saved in the data saver 321, the save determiner 2334 may determine a discard priority for the object data. The discard priority of the object data may be determined, based on how long the object data is saved in the data saver 321 and the transmission frequency of the object data to the user device 2. For example, if object data is saved in the data saver 321 for a certain period of time but not transmitted to a user device 2 during that period, the discard priority value of the object data may be increased by a preset amount. Until data is deleted to free up space on the data saver 321, until the storage capacity reaches a certain amount, the object data is discarded in a descending order of the discard priority. The save determiner 2334 performs the discard process periodically.

By having the save determiner 2334, useful object data can be saved in the data saver 321 in a prioritized manner. When the object data requested by the first query is saved in the data saver 321, the object data saved in the data saver 321 can be transmitted to the user device more quickly than collecting the object data by using the second query.

Practically speaking, the remote monitor 2 and the road abnormality detector, which are the examples of a user device, are typically connected to the server 203 by a wire, that is, as a wired communication, which allows for low cost communication between the user device and the server 203. On the other hand, the communication between the server 203 and the data providing terminal 4 is typically via wireless communication, and the cost of such communication may be higher than the communication costs between the server 203 and the user device. Therefore, the data cost, i.e., cost for obtaining data, for the system as a whole can be reduced by performing prioritized storage of useful object data in the data saver 321, as described in the present embodiment.

<Sixth Embodiment>

In the previously-described embodiments, the transmission destination of the object data determined in the second query is the server 3. However, the transmission destination determined in the second query may be different than the server 3. For example, the transmission destination may be a terminal that is different from the server 3.

According to the sixth embodiment, the object data that is obtained by one data providing terminal 4 is transmitted to another data providing terminal 4 by a V2V (i.e., vehicle to vehicle) communication. In such instances, the data providing terminal 4 which receives the object data acts like a user device. The data providing terminal 4 acting as the user device may transmit a first query to the server 3.

In the exemplary embodiment, it may be assumed that the first query received by the server 3 includes an object process of "transfer to the query requester," object data that is the current image and sound near a position y, and execution requirements, i.e., purpose of use, as a road condition confirmation. When the server 3 receives a first query, i.e., YES at S1 of FIG. 7, the process performed by the server 3 proceeds to S2.

When the object data has not been saved and there is no plan to receive the object data, the process proceeds to S4. The second query is determined at S4. The second query determined at S4 may include an object process of "transmission to the data providing terminal 4," i.e., the query requester. The second query determined in S4 may also include that the object data is a camera image of the position y captured from a viewable range and that the process requirements are a communication speed of 1 Mbps or more and a communication delay of 10 seconds or less. In this example, the address of the data providing terminal 4 (i.e., the transmission destination) is also included in the second query so that data may be transmitted to the data providing terminal 4. The server 3 receives the address of the data providing terminal 4 in advance as the probe information.

The receiver terminal requirements are determined at S5. The receiver terminal requirements are requirements that include, for example, that the current position is less than 100 m from the position y, that V2V communication may be performed, and that an image and sound associated with the position y may be obtained. The V2V communication includes a direct V2V communication and an indirect V2V communication. An indirect V2V communication is a V2V communication via a base station, and a direct V2V communication is communication that bypasses the base station.

The transmission destination of the second query is determined in S6. When the number of the data providing terminals 4 satisfying the receiver terminal requirements is more than required, the transmission destination of the second query may be determined only as the terminal 4 that is capable of performing the direct V2V communication. For performing this filtering process, a fill rate score that considers the direct V2V communication capability may be used to evaluate the terminals 4.

At S7, a second query is transmitted to the transmission destination determined at S6. Since the V2V communication is requested in the second query, the processes after S8 may not be performed in the sixth embodiment.

<Seventh Embodiment>

In the previously-described embodiments, the time specified in the first query relates only to the time for obtaining the data. However, a terminal time requirement that may specify when the data providing terminal 4 obtain the data may be included in the first query. In the present embodiment, the data providing terminal 4 is not disposed within the vehicle 5, but may be disposed outside of the vehicle, for example, in a house or other building.

An example of the first query including a terminal time requirement is described as follows. The object process may be "transmission to the query requester." The object data requirements may include an attribute of a data type with the corresponding requirement being a position and a current room image. The object data requirements may further define an attribute of a terminal state, for example gravimetry or measurement of gravity, with the corresponding requirement being a valid term of such terminal state.

In this exemplary embodiment, the requirement for the terminal state may define that the maximum acceleration due to gravity be greater than 500 Gal (i.e., $cm/s^2$). The valid term of the terminal state is defined that such a maximum acceleration is observed at a time between 9:00-9:05. That is, 9:00-9:05 may be a terminal time requirement.

This first query may be a query for obtaining data of an earthquake occurring between times 9:00-9:05. For example, the first query may be used to determine a position near the epicenter of the earthquake and include a current image of such position. This first query may be transmitted from a device operated by a user conducting a disaster damage investigation, for example.

In this exemplary embodiment, it is assumed that the server 3 receives the first query, i.e. YES at S1 in FIG. 7. Further, it is assumed that the object data has not yet been saved and there is no plan to receive the object data. Therefore, both of the determinations made at S2 and S3 branch to NO, and the process proceeds to S4. A second query is determined at S4. The second query may include an object process of "transmission to a server," and that the object data is a room image. The object data requirements may further include a time requirement such as the current time or a time closest to the current time. The process requirements may include that the transfer delay is equal to or less than 5 minutes.

The receiver terminal requirements are determined at S5. The receiver terminal requirements may include that the camera type or "C" type terminal be a terminal that can obtain a room image, and that the terminal state is the maximum acceleration detected during 9:00-9:05 greater than 500 Gal. To determine these requirements in the present exemplary embodiment, it is assumed that the probe information including the acceleration is transmitted to the server 3 at a cycle shorter than 5 minutes. A receiver terminal requirement may be that latest probe information received from the data providing terminal 4 be received within 1 minute from the current time. This receiver terminal requirement may check or confirm that the data providing terminal 4 is not damaged or broken.

The data providing terminal 4 satisfying the receiver terminal requirements is set as the transmission destination of the second query at S6, and the second query is transmitted at S7.

The data providing terminal 4 receiving the second query may capture a still image at the current time, and transmit the image to the server 3. As such, the process at S8 in FIG. 7 branches to YES, and the server 3 transfers the still image to the user device.

In this exemplary embodiment, the user device can easily obtain the position near the epicenter of an earthquake and provide current images of positions near the epicenter. Of course, the target phenomenon may not be limited to earthquake detection and capturing images related to possible earthquake damage. That is, the data providing terminal 4 may be provided with other sensors to make other damage assessments. For example, the data providing terminal 4 may be provided with a rainfall sensor and a humidity sensor to obtain moisture and humidity levels in a room after a large downpour, hurricane, and like storms.

<Eighth Embodiment>

The previously-described embodiments describe that a terminal time requirement may be included in the first query. For example, the terminal time requirement in the seventh embodiment specifies a time in the past. However, a future time may also be specified as the terminal time requirement.

According to the eighth embodiment, the first query may include a terminal time requirement that specifies a future time. An example of such first query specifying a future time may be in an instance where a vehicle is going to merge to another road at point M, where such vehicle has requested merge support from a merge support device. In this example, the merge support device may transmit a first query that specifies a future time to the server 3 and the merge support device may be the user device. In this exemplary embodiment, the data providing terminal 4 may be disposed in the vehicle 5, i.e., the subject vehicle.

The first query transmitted from the merge support device may be a query that requests a high frequency transmission of data to the subject vehicle during a period from time t1 to time t3, for data satisfying certain requirements. That is, in the present embodiment, the query transmission time is specified.

In the first query, the requirements may include an object "terminal position" (e.g., a position of the subject vehicle), and the terminal state may be specified as traveling in a traffic lane A at or around point M, with a merging road (i.e., another road) connected to the lane A at or around point M, and such a terminal state is defined as having a valid term from time t2 to time t3. The time from Time t2 to time t3 may be a future time, and this period may be the terminal time requirement in the present embodiment. In this exemplary embodiment, point M is a position requirement for the terminal in the subject vehicle, that is, the position of the terminal at a future time as defined by the terminal time requirement.

Unlike the first query described by the previous embodiments, the first query in this exemplary embodiment does not specify the object process and the object data requirements. However, the server 3 in this exemplary embodiment may be able to analyze the first query to extract the object process and the object data requirements.

When the server 3 receives the first query, i.e. YES S1 in FIG. 7, the process proceeds to S2. Since the object data requested by the first query is data at a future time, no data is saved at S2, i.e., NO at S2, and the process proceeds to S3. Since this exemplary embodiment assumes that the determination of the process at S3 is NO, the second query is determined at S4.

The second query includes that the object process is a "transmission" to the server and that the object data is the current position during the period from time t2 to time t3. In this exemplary embodiment, it is assumed that the process requirements include a requirement for a transfer cycle being equal to or less than 5 seconds and a requirement for a transfer delay being equal to or less than 1 second. These process requirements may be determined by the server 3, based on an analysis that the first query demand of high frequency data transmission as an execution requirement.

The receiver terminal requirements are determined at S5. In this exemplary embodiment, the receiver terminal requirements may specify that the data providing terminal 4 is a camera type terminal or "C" type terminal capable of transmitting the current position within a cycle of 5 seconds and capable of detecting the current position as accurately as possible to distinguish between two adjacent traffic lanes on a road.

The reason for specifying a requirement that the terminal be capable of transmitting the current position in or under a 5 second cycle is due to the first query request that the position of the subject vehicle be transmitted at a high frequency. The reason for specifying a requirement that the vehicle position be detected as accurately as possible to distinguish between two traffic lanes on a road, is due to the first query request that specifies traveling in the traffic lane A as a requirement. The receiver terminal requirements may further specify that the terminal/subject vehicle is expected to pass point M in the traffic lane A during a period from time t2 to time t3.

At S6, based on the probe information saved in the data saver 321, the data providing terminal 4 satisfying the receiver terminal requirements is searched for. In instances where the travel plan is intermittently transmitted from the data providing terminal 4, the position of the data providing terminal 4 during a period of time from time t2 to time t3 is predicted based on the travel to determine whether the requirement of passing point M in the traffic lane A during a period from time t2 to time t3 is satisfied.

The travel plan is, for example, a route guidance and a scheduled time at each of the guidance points on a guidance route, on which the terminal/vehicle is traveling. If the vehicle is an auto-drive vehicle, the travel plan may be the route plan and scheduled times of the vehicle's route, as planned by the auto-drive system in the vehicle.

In instances where the data providing terminal 4 cannot provide a travel plan, that is, the data providing terminal cannot provide information based on the travel locus of the terminal 4 during a certain period of time in the past and the shape of the road ahead, the position of the data providing terminal 4 during the period from time t2 to time 3 is predicted.

After determining the requirement satisfying terminal(s) 4 as the transmission destination of the second query, the process at S7 is performed and the second query is transmitted to the destination terminal(s) 4. However, since the transmission time of the query is specified in the first query as a period between time t1 and time t3, the second query should be transmitted at or after time t1. That is, if the current time when performing the process at S7 is before time t1, the transmission of the second query should be postponed until at least time t1.

Then, the process proceeds to S8. However, in the eighth embodiment, the processes at S6 and S7 are performed and repeated together with the determination process at S8 until time t3. This is because the data providing terminal 4 may later satisfy the receiver terminal requirements if they are not satisfied initially at S6, for example, due to a position change, a situation change or the like. For example, a vehicle traveling in an adjacent lane when the process at S6 is performed may later change lanes to be traveling in the lane A and thus, the terminal 4 in the vehicle may now satisfy the receiver terminal requirements at a later time.

The data providing terminal 4 having received the second query before time t2 executes the second query, and transmits the current position to the server 3 during the period from time t2 to time t3. On the other hand, the data providing terminal 4 receiving the second query after time t2 executes the second query and transmits the current position to the server 3 during a period from when the second query is received to time t3.

According to the eighth embodiment, the user device can easily obtain the object data at a future time.

<Ninth Embodiment>

Figure 13:
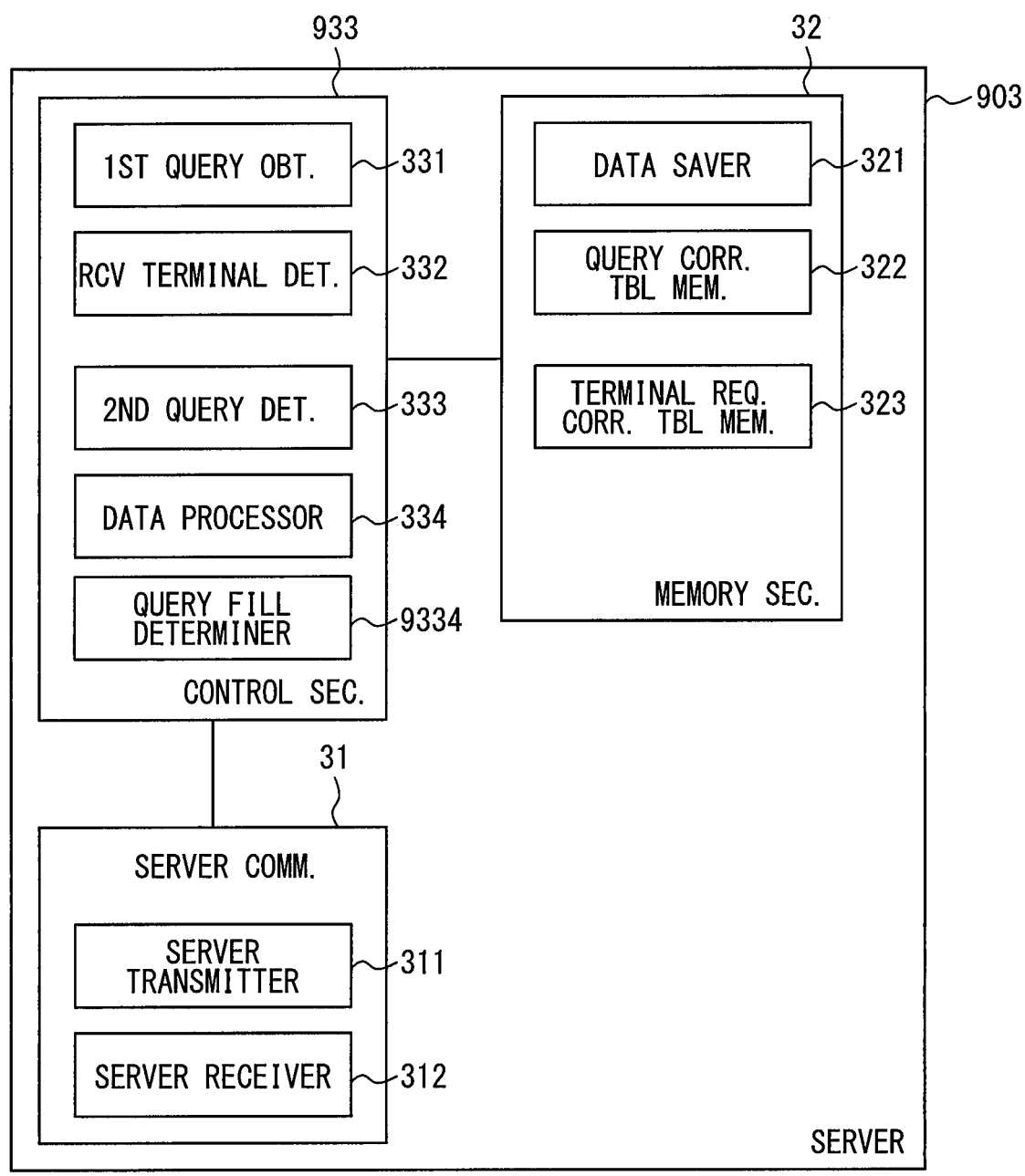
FIG. 13 illustrates block diagram of a server configuration.

FIG. 13 shows a block diagram of a configuration of a server 903. In the previously described third embodiment, when the terminal 4 cannot execute the second query upon receiving the second query, the terminal 4 notifies the server 3. The server 3, upon receiving such notification, is thus enabled to determine whether the server 3 can provide the object data to the user based on such notification.

In the current exemplary embodiment, when the object data cannot be provided to the user device or when it is probable that object data may not be able to be provided to the user device, the server 3 notifies the user device.

Similar to the third embodiment, the first query in the present embodiment includes the execution requirements. A query fill determiner 9334 in the control section 933 of the server 903 determines first query fill information. The first query fill information is information regarding the possibility of providing the user-request data to the user device according to the execution requirements included in the first query.

[Concrete Content of the First Query Fill Information]

The first query fill information is information regarding whether the execution requirements included in the first query are all able to be satisfied (i.e., fillable) or not. The first query fill information may also be information of non-fillable execution requirements, for example, the non-fillable execution requirements may be provided in a list form. When the first query fill information is information regarding the non-fillable execution requirements, the first query fill information indicates whether all the execution requirements are fillable based on whether there is a list of non-fillable execution requirements. Therefore, information of whether all the execution requirements are fillable may be omitted from the first query fill information. Alternatively, the first query fill information may include both information as to whether all the execution requirements are fillable and information regarding the non-fillable execution requirements.

When the position of the data providing terminal 4 in the future is predictable when the first query fill information is determined, the content of the first query fill information may indicate that the user-requested data may be provided to the user device until time t10 based on the execution requirements in the first query, and that the user-requested data may not be provided after time t10 based on the execution requirements.

[Determination Timing of the First Query Fill Information]

The query fill determiner 9334 determines the first query fill information when the first query obtainer 331 obtains the first query. The query fill determiner 9334 may also determine the first query fill information periodically thereafter. The timing of the first query fill information determination may be at a predetermined interval cycle. Alternatively, or additionally, the query fill determiner 9334 may determine the first query fill information when it receives a notification from the data providing terminal 4 indicating that the data providing terminal 4 can no longer execute the second query.

[Determination Method of the First Query Fill Information]

At the time of obtaining the first query by the first query obtainer 331, the first query fill information is determined based on the information saved in the data saver 321. The information stored in the data saver 321 used to determine the first query fill information may be the information for determining whether the data providing terminal 4 satisfies the receiver terminal requirements. For example, the information for determining whether the data providing terminal 4 is a terminal that corresponds to the receiver terminal requirements may be a position of the terminal 4, a sensor type in the terminal 4, a communication line type or communication speed available to the terminal 4, and the like.

In instances where the first query fill information is determined at a later time, i.e., at a time after the first query obtainer 331 receives the first query, the query fill determiner 9334 can determine the first query fill information in the same manner as previously described, i.e., when the determiner 9334 determines the first query fill information upon receiving the first query. That is, the first query fill information is determined periodically after receiving the first query, based on the information saved in the data saver 321.

When the requirements in the first query include a position requirement or a section (i.e., a position range) requirement for the terminal 4 obtaining the object data, and when the travel plan of the data providing terminal 4 is collected periodically and stored as the probe information, the first query fill information may be determined in the following manner.

The position of the data providing terminal 4 is updated periodically based on the latest probe information, and based on the updated position of the terminal 4, an evaluation is made to determine whether the data providing terminal 4 satisfied the requirements of the first query. The travel plan that may be periodically obtained from the terminal 4, may change, depending on the situation. That is, the latest travel plan obtained from the terminal 4 may, in the future, no longer satisfy the position or section requirements of the first query, even if the same terminal 4 may have satisfied the requirements based on an old travel plan. In such instances, the number of terminals 4 satisfying the requirements may decrease after a subject terminal 4 exits the area (i.e., locational position) where the subject terminal 4 satisfied the positional requirements. When the number of satisfying terminals 4 (i.e., terminals 4 satisfies the execution requirements in the first query) decreases to be less than the specified number, the first query fill information regarding such a decrease may be used as information to indicate that the execution requirements of the first query are not fillable.

The first query fill information may be determined based on the information transmitted from the data providing terminal 4. Similar to the third embodiment, when the data providing terminal 4 in the present exemplary embodiment cannot execute the second query when the second query is received, the data providing terminal 4 notifies the server 903 that the second query cannot be executed. However, in the present embodiment, the data providing terminal 4 also notifies the server 903 whether the executable state of the second query is likely to continue. That is, the data providing terminal 4 notifies the server 903 of whether there is a condition causing the non-execution of the second query and predicts the non-execution of the second query based on available information. The data providing terminal 4 may transmit such non-execution predictions to the server 903.

For example, when the requirements in the second query include a communication speed requirement, the communication speed of the available communication line may change depending on the communication environment, or based on the position of the terminal 4. That means, even if the second query is executable when it is received by the terminal 4, the later execution of the second query by the terminal 4 may be hindered due to situational change, for example, the deterioration of the communication environment (i.e., diminished communication speeds). Such a situational change may be predicted based on diminished communication speeds relative to a communication speed map, where it may be predicted that communication speeds may fall short of the process requirements of the second query as the vehicle 5 and the terminal 4 move toward areas of the communication map with lower communication speeds.

When the second-query cannot be executed, or when it is predicted that the second query cannot be executed, the data providing terminal 4 notifies the server 903 of such a situation. The notification to the server 903 may include reasons why the second query cannot be executed, such as a decline in communication speeds.

When the query fill determiner 9334 receives the notification that the second query cannot be executed from the data providing terminal 4, future or receives a notification indicating that the second query may not be able to be executed at a future time, the query fill determiner 9334 decreases the number of the data providing terminals 4 satisfying the first query. In instances where the number of the terminals 4 satisfying the first query decreases to be less than the specified number, the first query fill information is updated to reflect the decrease. When the content of the first query fill information is the number of terminals 4 satisfying the first query, the first query fill information is updated regardless of whether the number of the satisfying terminals 4 falls below the specified number.

When the notification from the data providing terminal 4 includes the cause or reason why the second query cannot be executed, is the requirement or requirements that have not been satisfied are identified based on the cause and the query correspondence table. Then, the first query fill information may be updated to include the information that indicates which of the one or more execution requirements is/are not satisfied.

[Transmission Timing of the First Query Fill Information]

The query fill determiner 9334 transmits the first query fill information to the user device from the server transmitter 311. The query fill determiner 9334 transmits the first query fill information when the content of the first query fill information changes from information indicating that the object data (i.e., the user-requested data) may be provided to the user device based on the execution requirements of the first query to information indicating that the object day may not be provided to the user device based on the execution requirements.

To enable the transmission of the first query fill information at such time, the query fill determiner 9334 determines the first query fill information periodically after the second query determiner 333 determines the second query.

When the first query is obtained from the user device, the query fill determiner 9334 may determine the first query fill information and transmit the first query fill information to the user device. After the second query determiner 333 determines the second query, the first query fill information may be periodically transmitted to the user device.

[Response Operation of the User Device]

In response to the notification of the first query fill information, the user device can promptly stop a wait state based on an assumption that the object data may be provided, or the user device can promptly issue a new first query that has different requirement(s), such as more relaxed requirements.

As mentioned above, although the embodiments of the present disclosure are described in detail, it is not limited to the above-mentioned embodiments and the following modifications may also be included in the technical scope of the present disclosure. The present disclosure may be further modified and implemented as long as the gist of such modification does not deviate from the technical scope of the disclosure.

<Modification 1>

As shown in FIG. 5 and FIG. 10, the second query may include requirements that are not variably changed. For the requirements that are not changed, an advanced determination may be made to determine whether the second query may be executed by the data providing terminal 4, on a terminal by terminal basis, for each of the data providing terminals. A terminal-specific second query correspondence table that specifies and stores executable second queries for each of the terminals 4 may be generated.

An executable second query may have, for example, a requirement for "obtaining a position," "obtaining measurement accuracy," "saving an image," "operating a sensor," "obtaining a position specific image," "obtaining a time specific image," or the like. From among the above requirements, a process for "obtaining X" may be specified as an object data requirement, and a process for "saving Y" may be specified as an object process. "Operating a sensor" means that a sensor is operated to change its setting, and, since "changing a sensor setting" results in a change of obtainable data, "operating a sensor" is also specified as an object data requirement.

When determining which data providing terminals 4 will receive a second query, each of the data providing terminals 4 in the terminal-specific second query correspondence table may be referred to based on the type of second query that may be executed by each of the respective terminals 4. Therefore, if a second query correspondence table is prepared in advance for each of the data providing terminals 4, the data providing terminal 4 that may be selected as the transmission destination of the second query can easily be determined. By preparing such information as a table, the information may be easily updated and appended.

Various alphanumerics may be used as labels throughout the specification. For example, time values described herein may be described in terms of t1, t2, t3, t10, while location values may be described in terms of Intersection "X," lane "A," or merge point "M." Unless otherwise indicated, these labels are intended to be indefinite without a specific value and used for the understanding of the reader. Further, such labels may not necessarily refer to reference characters used herein or be shown in the accompanying drawings.

Although the present disclosure has been fully described in connection with various exemplary embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A data delivery system comprising:
   a server including a processor and a non-transitory computer-readable storage medium, the server configured to communicate remotely with a user device and to obtain a first query from the user device, the first query comprising a request from the user device to the server for user-requested data; and
   a data providing terminal configured to communicate remotely with the server and to provide terminal data to the server in response to the user-requested data requested from the server by the user device, the terminal data comprising either user-requested data or data from which the user-requested data is derivable,
   wherein the server includes:
   a first query obtainer configured to obtain the first query from the user device, the first query defining requirements for the user-requested data;
   a second query determiner configured to determine a second query, based on the first query, for obtaining the terminal data from the data providing terminal, the second query including a data attribute, the second query configured to enable the data providing terminal to identify the terminal data based on the first query and to identify the user-requested data that satisfy the requirements based on the data attribute; and
   a server transmitter configured to transmit the second query to the data providing terminal, and
   wherein the data providing terminal includes:
   a terminal receiver configured to receive the second query transmitted from the server;
   a data obtainer configured to obtain the terminal data from the data providing terminal by executing the second query; and
      a terminal transmitter configured to transmit the terminal data to at least one of the server, the user device and a device identified by the second query.

2. The data delivery system of claim 1, wherein the server includes:
   a receiver terminal determiner configured to determine receiver terminal requirements for the data providing terminal, and to determine a receiver terminal based on the receiver terminal requirements, and
   the server transmitter is further configured to transmit the second query to the receiver terminal.

3. The data delivery system of claim 1, wherein
   the terminal transmitter is further configured to transmit the terminal data to the server, and wherein
   the server further includes a server receiver configured to receive the terminal data, and a data saver configured to save the terminal data, and wherein
   when the user-requested data is determinable from the terminal data, the server transmitter transmits the user-requested data to the user device and the second query determiner does not determine the second query.

4. The data delivery system of claim 1, wherein
   upon determining that no reception plan for receiving the user-requested data exists based on a history of the second query, the second query determiner determines the second query.

5. The data delivery system of claim 1, wherein
   the first query includes execution requirements for the data attribute include a processing time of the user-requested data, and
   the second query includes process requirements for the data attribute that are determined based on the execution requirements of the first query.

6. The data delivery system of claim 5, wherein the execution requirements define a frequency at which the user-request data is obtained.

7. The data delivery system of claim 3, wherein
   the server further includes a save determiner configured to determine the terminal data to be saved in the data saver based on a transmission history of the terminal data to the user device.

8. The data delivery system of claim 1, wherein
   the server further includes a publisher configured to publish the first query.

9. The data delivery system of claim 3, wherein
   the second query determiner is further configured to determine a stationary query as the second query, wherein
   the stationary query is a data request sent to the data providing terminal for obtaining the terminal data regardless of the first query, and wherein
   the server transmitter is further configured to transmit the stationary query to the data providing terminal.

10. The data delivery system of claim 9, wherein
    the stationary query includes a transmission frequency of the terminal data and the data attribute.

11. The data delivery system of claim 2, wherein
    the second query determiner is further configured to determine a stationary query as the second query, wherein the stationary query is a data request sent to the data providing terminal for obtaining the terminal data regardless of the first query, and wherein
    the server transmitter is further configured to transmit the stationary query to the data providing terminal and to transmit the terminal data to the server, and wherein
    the server further includes a server receiver configured to receive the terminal data and a data saver configured to save the terminal data, and wherein
    the receiver terminal determiner is further configured to determine whether a data providing terminal satisfies the receiver terminal requirements based on the terminal data saved in the data saver.

12. The data delivery system of claim 9, wherein
    the stationary query further includes an accumulation request that requests an accumulation of the terminal data in preparation for a transmission request of the terminal data in addition to including the data attribute of the terminal data that is requested, and the data providing terminal includes an accumulator configured to accumulate the terminal data when receiving the stationary query that includes the accumulation request.

13. The data delivery system of claim 9, wherein
the server further includes a publisher configured to publish the first query and an updater configured to update the first query published by the publisher.

14. The data delivery system of claim 2, wherein
when the first query includes a data attribute that is identifiable based on map data, and wherein
the receiver terminal determiner is further configured to determine a map range for obtaining the user-request data from the first query.

15. The data delivery system of claim 1, wherein
the server further includes a query correspondence table storage configured to store a query correspondence table that establishes a correspondence between the first query and the second query, and wherein
the second query determiner is further configured to determine the second query to be transmitted to the data providing terminal based on the first query and the query correspondence table.

16. The data delivery system of claim 2, wherein
the server further includes a terminal requirements correspondence table storage configured to store a terminal requirements correspondence table that establishes a correspondence between the first query and the receiver terminal requirements, and wherein
the receiver terminal determiner is further configured to determine the data providing terminal that receives the second query based on the first query and the terminal requirements correspondence table.

17. The data delivery system of claim 16, wherein
the terminal requirement correspondence table includes a fill rate score of at least one of the receiver terminal requirements, the fill rate score having a value that corresponds to a degree of fulfillment of the receiver terminal requirements, and wherein
the receiver terminal determiner is further configured to determine the receiver terminal that receives the second query from among a number of receiver terminals that satisfy the receiver terminal requirements based on the fill rate score.

18. The data delivery system of claim 5, wherein
the server further includes a query table storage configured to store a query correspondence table that establishes a correspondence between the first query and the second query, and wherein
the query correspondence table further establishes a correspondence between the execution requirements of the first query and the process requirements of the second query, and wherein
the second query determiner is further configured to determine the process requirements for the second query based on the execution requirements included in the first query and the query correspondence table.

19. The data delivery system of claim 2, wherein
the first query includes execution requirements for the user-requested data include a processing time of the user-requested data, and wherein
the second query includes process requirements for the data attribute that are determined based on the execution requirements of the first query, and wherein
the process requirements have a fill cost, and wherein the receiver terminal determiner is further configured to determine the data providing terminal that receives the second query by selecting the data providing terminal from a number of data providing terminals satisfying the receiver terminal requirements.

20. The data delivery system of claim 19, wherein
the fill cost is a communication cost for transmission of the terminal data from the terminal transmitter.

21. The data delivery system of claim 2, wherein
the receiver terminal determiner is further configured to determine the data providing terminal for executing the second query from among a number of data providing terminals based on a terminal-specific second query table that stores an executable second query specific to each of the number of data providing terminals.

22. The data delivery system of claim 9, wherein
from among a number of data providing terminals, when the server receives a new registration from one of the number of data providing terminals, the server transmitter is further configured to transmit the station query to a newly-registered data providing terminal and to transmit the stationary query to an already-registered data providing terminal.

23. The data delivery system of claim 1, wherein
the first query includes a terminal time requirement specifying a data obtaining time of the terminal data by a data obtaining terminal.

24. The data delivery system of claim 2, wherein
when the first query includes a terminal time requirement specifying a data obtaining time of the terminal data by a data obtaining terminal and the data obtaining time includes a future time, the receiver terminal determiner searches for a data providing terminal, from among a number of data providing terminals, for executing the second query at the future time.

25. The data delivery system of claim 24, wherein
the terminal time requirement further includes a position requirement for a position of the data providing terminal, and wherein
the receiver terminal determiner is further configured to determine the data providing terminal that receives the second query by predicting the position of the data providing terminal at the future time based on the terminal time requirement.

26. The data delivery system of claim 25, wherein
the receiver terminal determiner is further configured to predict the position of the data providing terminal at the future time based on a travel plan.

27. The data delivery system of claim 5, wherein
the server includes a query fill determiner that determines first query fill information for providing the user-requested data to the user device based on the execution requirements and that transmits the first query fill information to the user device.

28. The data delivery system of claim 27, wherein
after the second query is determined by the second query determiner, the query fill determiner periodically determines the first query fill information, and
transmits the first query fill information to the user device when the first query fill information indicates that the user-requested data is not providable to the user device based on the execution requirements.

* * * * *